United States Patent
Zeng et al.

(10) Patent No.: US 12,407,060 B2
(45) Date of Patent: Sep. 2, 2025

(54) BATTERY, POWER CONSUMPTION DEVICE, METHOD AND DEVICE FOR PREPARING A BATTERY

(71) Applicant: CONTEMPORARY AMPEREX TECHNOLOGY (HONG KONG) LIMITED, Hong Kong (CN)

(72) Inventors: Yuqun Zeng, Ningde (CN); Xiaobo Chen, Ningde (CN); Peng Wang, Ningde (CN); Yao Li, Ningde (CN); Yongshou Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 130 days.

(21) Appl. No.: 18/240,707

(22) Filed: Aug. 31, 2023

(65) Prior Publication Data

US 2023/0411774 A1 Dec. 21, 2023

Related U.S. Application Data

(63) Continuation of application No. 17/113,038, filed on Dec. 5, 2020, now Pat. No. 11,791,518, which is a
(Continued)

(51) Int. Cl.
*H01M 50/342* (2021.01)
*H01M 10/613* (2014.01)
(Continued)

(52) U.S. Cl.
CPC ..... *H01M 50/3425* (2021.01); *H01M 10/613* (2015.04); *H01M 10/625* (2015.04);
(Continued)

(58) Field of Classification Search
CPC ........... H01M 50/3425; H01M 50/204; H01M 50/209; H01M 50/342; H01M 50/358;
(Continued)

(56) References Cited

U.S. PATENT DOCUMENTS 8,105,708 B2   1/2012   Rudorff et al.
8,147,998 B2   4/2012   Yeo
(Continued)

FOREIGN PATENT DOCUMENTS

CN   101160689 A   4/2008
CN   101385187 A   3/2009
(Continued)

OTHER PUBLICATIONS

Office Action dated May 10, 2024 received in U.S. Appl. No. 17/113,042.
(Continued)

*Primary Examiner* — Eugenia Wang
(74) *Attorney, Agent, or Firm* — Scully, Scott, Murphy & Presser, P.C.

(57) ABSTRACT

Embodiments of the present application provide a battery. The battery includes: a battery cell comprising a pressure relief mechanism, the pressure relief mechanism being arranged in a first wall of the battery cell and the pressure relief mechanism being configured, when an internal pressure or temperature of the battery cell reaches a threshold, to be actuated to release the internal pressure; and a thermal management component for containing a fluid to adjust the temperature of the battery cell; wherein a first surface of the thermal management component is attached to the first wall, and the thermal management component is configured to be capable of being damaged when the pressure relief mechanism is actuated, so that the fluid is discharged from inside of the thermal management component. According to the
(Continued)

technical solutions of the embodiments of the present application, the safety of the battery can be enhanced.

14 Claims, 11 Drawing Sheets

Related U.S. Application Data continuation of application No. PCT/CN2020/101437, filed on Jul. 10, 2020.

(51) Int. Cl.

| | | |
|---|---|---|
| *H01M 10/625* | (2014.01) | |
| *H01M 10/647* | (2014.01) | |
| *H01M 10/6554* | (2014.01) | |
| *H01M 10/6556* | (2014.01) | |
| *H01M 50/204* | (2021.01) | |
| *H01M 50/209* | (2021.01) | |
| *H01M 50/358* | (2021.01) | |
| *H01M 50/375* | (2021.01) | |
| *H01M 50/609* | (2021.01) | |

(52) U.S. Cl.
CPC ..... *H01M 10/647* (2015.04); *H01M 10/6554* (2015.04); *H01M 10/6556* (2015.04); *H01M 50/204* (2021.01); *H01M 50/209* (2021.01); *H01M 50/342* (2021.01); *H01M 50/358* (2021.01); *H01M 50/375* (2021.01); *H01M 50/609* (2021.01); *H01M 2200/10* (2013.01); *H01M 2200/20* (2013.01); *H01M 2220/20* (2013.01)

(58) Field of Classification Search
CPC ............. H01M 50/375; H01M 50/609; H01M 10/613; H01M 10/625; H01M 10/647; H01M 10/6554; H01M 10/6556; H01M 2200/10; H01M 2200/20; H01M 2220/20
See application file for complete search history.

(56) References Cited

U.S. PATENT DOCUMENTS

| | | | |
|---|---|---|---|
| 8,758,923 | B2 | 6/2014 | Yoon et al. |
| 9,595,705 | B1 | 3/2017 | Buckhout |
| 10,476,115 | B2 | 11/2019 | Smith et al. |
| 11,450,916 | B2 | 9/2022 | Chen et al. |
| 11,631,919 | B2 | 4/2023 | Wu et al. |
| 11,791,518 | B2 | 10/2023 | Zeng et al. |
| 2009/0075158 | A1 | 3/2009 | Rudorff et al. |
| 2009/0159354 | A1 | 6/2009 | Jiang et al. |
| 2009/0181288 | A1 | 7/2009 | Sato |
| 2009/0220850 | A1 | 9/2009 | Bitsche et al. |
| 2009/0274952 | A1 | 11/2009 | Wood et al. |
| 2009/0305114 | A1 | 12/2009 | Yeo |
| 2009/0305116 | A1 | 12/2009 | Yang et al. |
| 2010/0136391 | A1 | 6/2010 | Prilutsky et al. |
| 2011/0135994 | A1 | 6/2011 | Yang et al. |
| 2011/0293974 | A1 | 12/2011 | Yoon et al. |
| 2012/0114993 | A1 | 5/2012 | Park et al. |
| 2012/0148889 | A1 | 6/2012 | Fuhr et al. |
| 2012/0164490 | A1 | 6/2012 | Itoi et al. |
| 2012/0282499 | A1* | 11/2012 | Eichinger ......... H01M 50/3425 429/56 |
| 2013/0011719 | A1 | 1/2013 | Yasui et al. |
| 2013/0059175 | A1 | 3/2013 | Engel et al. |
| 2013/0095356 | A1 | 4/2013 | Shimizu et al. |
| 2013/0240220 | A1 | 9/2013 | Loureiro et al. |
| 2015/0162648 | A1 | 6/2015 | Yang et al. |
| 2015/0214525 | A1 | 7/2015 | Lim |
| 2016/0293926 | A1 | 10/2016 | Yamada |
| 2017/0040653 | A1 | 2/2017 | Morris et al. |
| 2017/0170439 | A1 | 6/2017 | Jarvis et al. |
| 2017/0279169 | A1 | 9/2017 | Obrist et al. |
| 2017/0301965 | A1 | 10/2017 | Kato et al. |
| 2018/0047959 | A1 | 2/2018 | Kruger |
| 2018/0212208 | A1 | 7/2018 | Kim |
| 2018/0261814 | A1 | 9/2018 | Zacher |
| 2018/0351219 | A1 | 12/2018 | Smith et al. |
| 2019/0157636 | A1 | 5/2019 | Miler et al. |
| 2019/0173074 | A1 | 6/2019 | Ogawa et al. |
| 2019/0181419 | A1 | 6/2019 | Suba et al. |
| 2019/0207184 | A1 | 7/2019 | Koutari et al. |
| 2019/0229384 | A1 | 7/2019 | Tasiopoulos et al. |
| 2019/0273243 | A1 | 9/2019 | Motokawa et al. |
| 2020/0083575 | A1 | 3/2020 | Yoo et al. |
| 2020/0136110 | A1 | 4/2020 | Koutari et al. |
| 2020/0152941 | A1 | 5/2020 | Wynn et al. |
| 2020/0194819 | A1 | 6/2020 | Aikata et al. |
| 2020/0212526 | A1 | 7/2020 | Wu et al. |
| 2020/0251703 | A1 | 8/2020 | Aldrich |
| 2021/0104801 | A1 | 4/2021 | Chu et al. |
| 2021/0135319 | A1 | 5/2021 | You et al. |
| 2021/0296721 | A1 | 9/2021 | Omura et al. |
| 2022/0013755 | A1 | 1/2022 | Chen et al. |
| 2022/0013757 | A1 | 1/2022 | Wu et al. |
| 2022/0013849 | A1 | 1/2022 | Zeng et al. |
| 2022/0013853 | A1 | 1/2022 | Zeng et al. |
| 2022/0013854 | A1 | 1/2022 | Liang et al. |
| 2022/0069411 | A1 | 3/2022 | Wakabayashi et al. |

FOREIGN PATENT DOCUMENTS

| | | |
|---|---|---|
| CN | 101483227 A | 7/2009 |
| CN | 101604759 A | 12/2009 |
| CN | 102598358 A | 7/2012 |
| CN | 103123996 A | 5/2013 |
| CN | 103460469 A | 12/2013 |
| CN | 203589111 U | 5/2014 |
| CN | 104956513 A | 9/2015 |
| CN | 205488300 U | 8/2016 |
| CN | 106784489 A | 5/2017 |
| CN | 106785182 A | 5/2017 |
| CN | 206301865 U | 7/2017 |
| CN | 206401400 U | 8/2017 |
| CN | 207097998 U | 3/2018 |
| CN | 208256764 U | 12/2018 |
| CN | 208298909 U | 12/2018 |
| CN | 110061329 A | 7/2019 |
| CN | 209071461 U | 7/2019 |
| CN | 209104274 U | 7/2019 |
| CN | 110165104 A | 8/2019 |
| CN | 110199406 A | 9/2019 |
| CN | 110277533 A | 9/2019 |
| CN | 209401662 U | 9/2019 |
| CN | 209626294 U | 11/2019 |
| CN | 209804781 U | 12/2019 |
| CN | 209822772 U | 12/2019 |
| CN | 110707260 A | 1/2020 |
| CN | 210129540 U | 3/2020 |
| CN | 111106227 A | 5/2020 |
| CN | 111106277 A | 5/2020 |
| CN | 210467893 U | 5/2020 |
| CN | 210576161 U | 5/2020 |
| CN | 210576163 U | 5/2020 |
| CN | 111384324 A | 7/2020 |
| CN | 211376746 U | 8/2020 |
| CN | 213026308 U | 4/2021 |
| CN | 213026309 U | 4/2021 |
| CN | 213584016 U | 6/2021 |
| CN | 213601965 U | 7/2021 |
| CN | 114175363 A | 3/2022 |
| CN | 114175365 A | 3/2022 |
| CN | 114175377 A | 3/2022 |
| CN | 114175378 A | 3/2022 |
| CN | 114175381 A | 3/2022 |
| CN | 114258611 A | 3/2022 |
| DE | 102014001352 A1 | 8/2015 |
| DE | 102017212223 A1 | 1/2019 |
| EP | 2804188 A1 | 11/2014 |
| EP | 2359432 B1 | 8/2018 |

(56) References Cited

FOREIGN PATENT DOCUMENTS

| | | |
|---|---|---|
| EP | 3675218 A1 | 7/2020 |
| EP | 3796412 A1 | 3/2021 |
| JP | 2007027011 A | 2/2007 |
| JP | 2009164085 A | 7/2009 |
| JP | 2009534811 A | 9/2009 |
| JP | 2013509688 A | 3/2013 |
| JP | 2014132585 A | 7/2014 |
| JP | 2014160573 A | 9/2014 |
| JP | 2015018706 A | 1/2015 |
| JP | 2018067387 A | 4/2018 |
| JP | 2019029245 A | 2/2019 |
| JP | 2019091628 A | 6/2019 |
| JP | 2019129149 A | 8/2019 |
| KR | 20100081942 A | 7/2010 |
| KR | 101269721 B1 | 5/2013 |
| KR | 20160066909 A | 6/2016 |
| KR | 101799540 B1 | 11/2017 |
| KR | 20180104567 A | 9/2018 |
| KR | 20190089121 A | 7/2019 |
| RU | 60792 U1 | 1/2007 |
| RU | 2636059 C2 | 11/2017 |
| RU | 2675595 C1 | 12/2018 |
| RU | 186666 U1 | 1/2019 |
| RU | 2721432 C2 | 5/2020 |
| WO | 2013006121 A1 | 1/2013 |
| WO | 2013034225 A1 | 3/2013 |
| WO | 2015045404 A1 | 4/2015 |
| WO | 2018234207 A1 | 12/2018 |
| WO | 2020026973 A1 | 2/2020 |
| WO | 2020133745 A1 | 7/2020 |
| WO | 2020133751 A1 | 7/2020 |
| WO | 2021008875 A1 | 1/2021 |

OTHER PUBLICATIONS

Office Action dated Jun. 4, 2024 received in U.S. Appl. No. 17/113,013.
Extended European Search Report dated Feb. 14, 2024 received in European Patent Application No. EP 23204083.2.
Notice of Preliminary Rejection dated Jan. 31, 2024 received in Korean Patent Application No. KR 10-2021-7043325.
Notice of Allowance dated Feb. 8, 2024 received in Korean Patent Application No. KR 10-2021-7042848.
Office Action dated Dec. 14, 2023 received in U.S. Appl. No. 15/734,449.
Notice of Registration and Grant of Patent for Invention dated Dec. 1, 2023 received in Chinese Patent Application No. CN 202080005840.0.
Notice of Registration and Grant of Patent for Invention dated Nov. 28, 2023 received in Chinese Patent Application No. CN 202080005854.2.
First Office Action dated Sep. 4, 2023 received in Chinese Patent Application No. CN 202080005840.0.
First Office Action dated Aug. 31, 2023 received in Chinese Patent Application No. CN 202080005854.2.
Notice of Reasons for Refusal dated Aug. 21, 2023 received in Japanese Patent Application No. JP 2022-534435.
Office Action dated Dec. 22, 2022 received in U.S. Appl. No. 15/734,449.
Office Action dated Sep. 16, 2022 received in U.S. Appl. No. 17/123,092.
Office Action dated Jun. 1, 2023 received in U.S. Appl. No. 15/734,449.
Office Action dated Jun. 7, 2023 received in U.S. Appl. No. 17/113,042.
Grant a Patent for an Invention dated Mar. 14, 2023 received in Russian Patent Application No. RU 2023100798/07.
Notice of Reasons for Refusal dated Jan. 30, 2023 received in Japanese Patent Application No. JP 2021-578156.
Notice of Reasons for Refusal dated Jan. 30, 2023 received in Japanese Patent Application No. JP 2021-578107.
Notice of Reasons for Refusal dated Jan. 16, 2023 received in Japanese Patent Application No. JP 2021-576383.
Examination Report dated Mar. 2, 2023 received in Indian Patent Application No. IN 202117059130.
Office Action dated Mar. 14, 2023 received in European Patent Application No. EP 20811946.1.
First Office Action dated Oct. 9, 2022 received in Chinese Patent Application No. CN 202080005847.2.
Office Action dated Oct. 21, 2022 received in U.S. Appl. No. 17/113,038.
Office Action dated Jul. 21, 2023 received in Russian Patent Application No. RU 2023101348/07.
Office Action dated Jul. 11, 2023 received in Russian Patent Application No. RU 2023101397/07.
Office Action dated Aug. 3, 2023 received in Russian Patent Application No. RU 2023100981/07.
Office Action dated Jul. 11, 2023 received in Russian Patent Application No. RU 2023101396/07.
Office Action dated Jul. 11, 2023 received in Russian Patent Application No. RU 2023101521/07.
First Office Action dated Jul. 14, 2023 received in Chinese Patent Application No. CN 202080005870.1.
Office Action dated Jul. 4, 2023 received in Canadian patent Application No. CA 3,156,564.
International Search Report and Written Opinion dated Feb. 25, 2021 received in International Application No. PCT/CN2020/101449.
Notice of Reasons for Refusal dated Jul. 18, 2023 received in Japanese Patent Application No. JP 2022-538852.
Extended European Search Report dated Aug. 1, 2023 received in European Patent Application No. EP 23171327.2.
Extended European Search Report dated Jan. 17, 2022 received in European Patent Application No. EP 20811946.1.
Extended European Search Report dated Oct. 29, 2021 received in European Patent Application No. EP 20811504.8.
Extended European Search Report dated Oct. 27, 2021 received in European Patent Application No. EP 20803075.9.
Extended European Search Report dated Oct. 26, 2021 received in European Patent Application No. EP 20803071.8.
Extended European Search Report dated Dec. 7, 2021 received in European Patent Application No. EP 20803067.6.
International Search Report and Written Opinion dated Apr. 16, 2021 received in International Application No. PCT/CN2020/101435.
International Search Report and Written Opinion dated Apr. 15, 2021 received in International Application No. PCT/CN2020/101441.
International Search Report and Written Opinion dated Mar. 25, 2021 received in International Application No. PCT/CN2020/101439.
International Search Report and Written Opinion dated Apr. 15, 2021 received in International Application No. PCT/CN2020/101440.
International Search Report and Written Opinion dated Apr. 15, 2021 received in International Application No. PCT/CN2020/101437.
Notice of Allowance dated Jun. 2, 2022 received in U.S. Appl. No. 17/113,025.
Office Action dated Feb. 9, 2022 received in U.S. Appl. No. 15/734,449.
Request for the submission of an opinion dated Sep. 20, 2024 received in Korean Application No. 10-2022-7018654.
EP Office Action dated Apr. 1, 2025 issued in EP Application No. 23150916.7.
Office Action dated Jul. 2, 2025 received in United States U.S. Appl. No. 17/113,013.

* cited by examiner

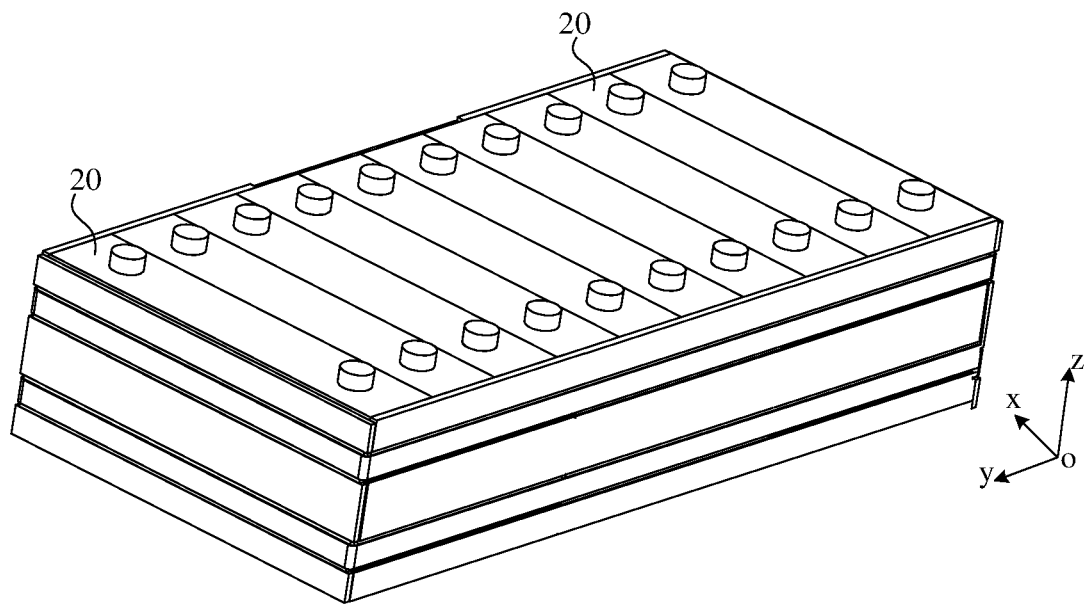
Fig. 3
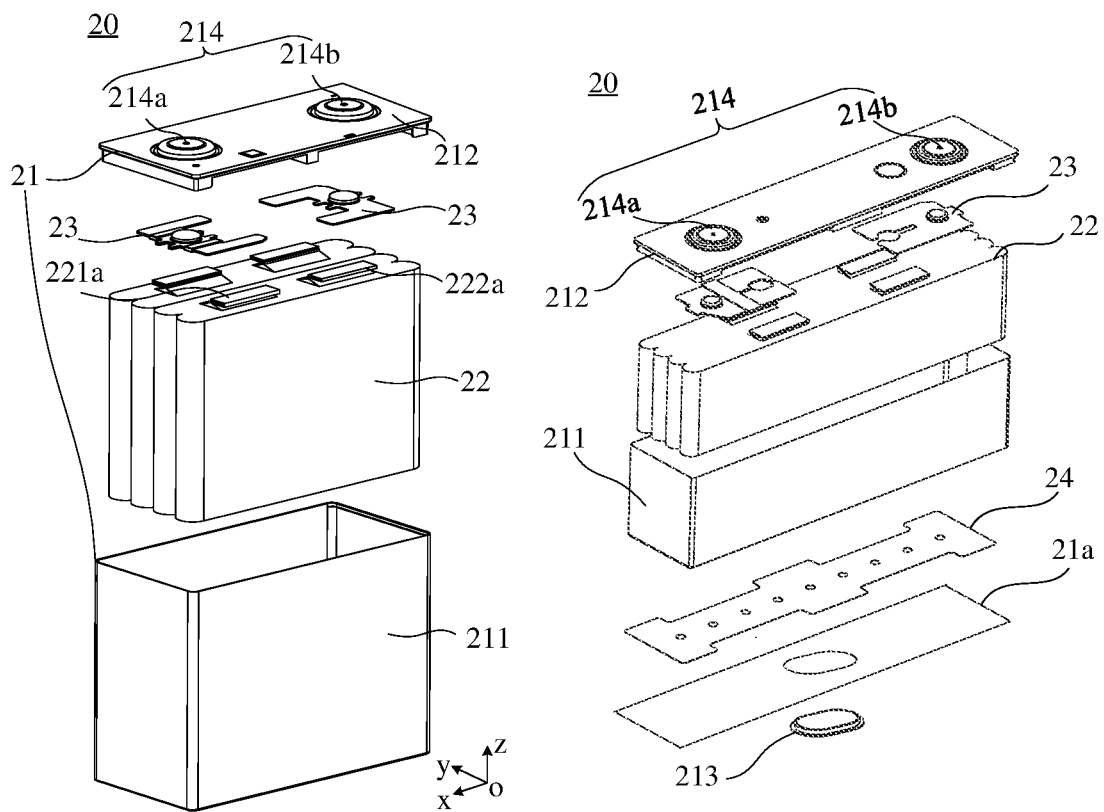
Fig. 4
Fig. 5

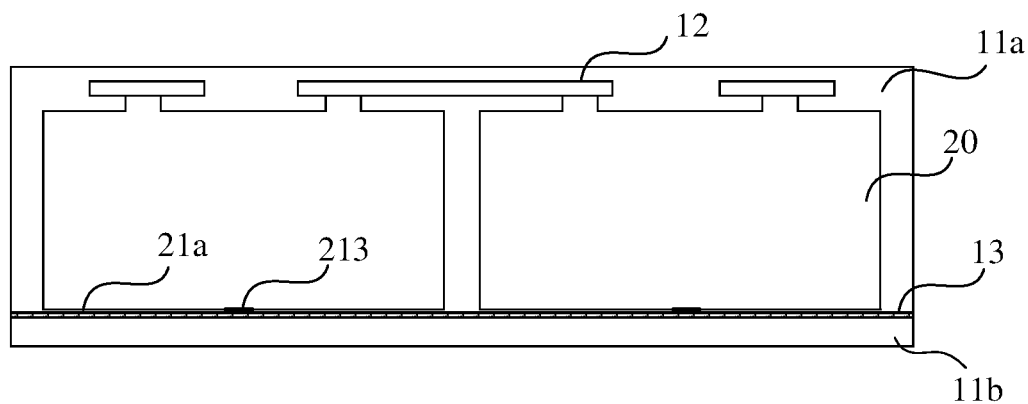
Fig. 12
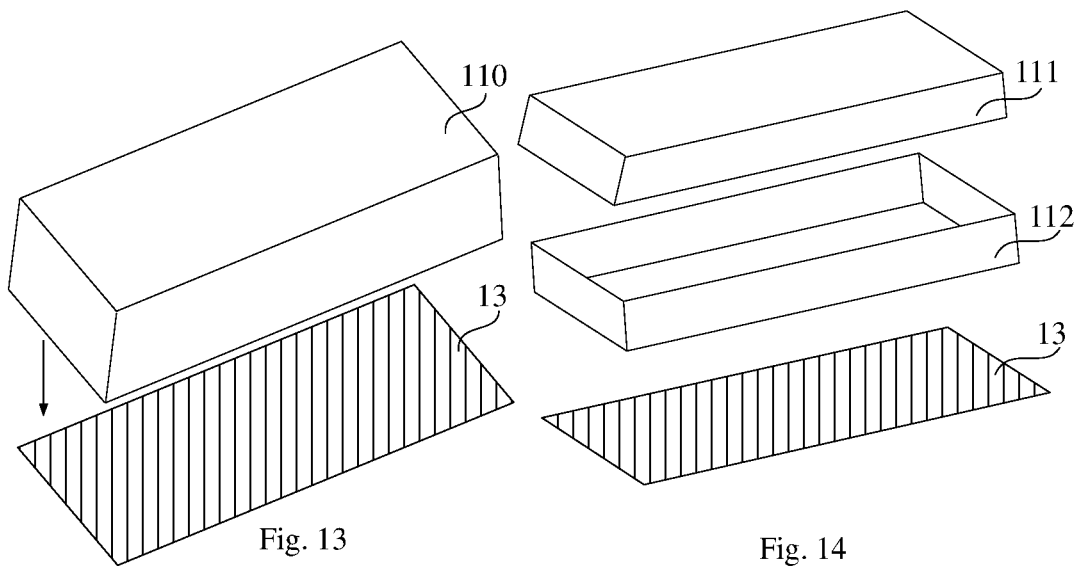
Fig. 13
Fig. 14

BATTERY, POWER CONSUMPTION DEVICE, METHOD AND DEVICE FOR PREPARING A BATTERY

CROSS-REFERENCE TO RELATED APPLICATIONS

This application is a continuation of U.S. patent application Ser. No. 17/113,038 filed on Dec. 5, 2020, which is a continuation of International Application No. PCT/CN2020/101437, filed on Jul. 10, 2020, which is hereby incorporated by reference in its entirety.

TECHNICAL FIELD

Embodiments of the application relate to the field of batteries, and more particularly to a battery, a power consumption device, and a method and a device for preparing a battery.

BACKGROUND

Energy saving and emission reduction are the key to the sustainable development of the automobile industry. In this case, electric vehicles have become an important part of the sustainable development of the automobile industry because of their advantages of energy saving and environmental friendliness. For the electric vehicles, the battery technology is an important factor related to their development.

In the development of the battery technology, in addition to improving the performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

Embodiments of the application provides a battery, a power consumption device, a method and a device for preparing a battery, which can enhance the safety of the battery.

In a first aspect, a battery is provided, comprising: a battery cell comprising a pressure relief mechanism, the pressure relief mechanism being arranged in a first wall of the battery cell and the pressure relief mechanism being configured, when an internal pressure or temperature of the battery cell reaches a threshold, to be actuated to release the internal pressure; and a thermal management component for containing a fluid to adjust a temperature of the battery cell; wherein a first surface of the thermal management component is attached to the first wall, and the thermal management component is configured to be capable of being damaged when the pressure relief mechanism is actuated, so that the fluid is discharged from inside of the thermal management component.

In an embodiment of the present application, the first surface of the thermal management component is attached to the first wall provided with the pressure relief mechanism therein. As such, when the pressure relief mechanism is actuated, emissions from the battery cell are discharged toward the thermal management component. Also, the thermal management component is configured to be capable of being damaged when the pressure relief mechanism is actuated, so that a fluid is discharged from the inside of the thermal management component. As such, the fluid may absorb the heat from the battery cell, and reduce the temperature of the emissions. Due to the cooling of the fluid, the temperature of the emissions from the battery cell may be reduced rapidly, so that the risk caused by the abnormality of a single battery cell can be suppressed in the first time, the possibility of battery explosion can be reduced, and the safety of the battery can be enhanced.

In some embodiments, the thermal management component is configured to be capable of being damaged by emissions discharged from the battery cell when the pressure relief mechanism is actuated, so that the emissions pass through the thermal management component.

With the actuation of the pressure relief mechanism, the emissions discharged from the battery cell pass through the thermal management component and quickly move away from the battery cell, which further reduces the risk caused by the emissions.

In some embodiments, the thermal management component is provided with a recess therein, a side surface of the recess is configured to be capable of being damaged by emissions discharged from the battery cell, so that the fluid is discharged from the inside of the thermal management component.

In some embodiments, a bottom wall of the recess is configured to be capable of being damaged by the emissions when the pressure relief mechanism is actuated, so that the emissions pass through the thermal management component.

In some embodiments, the side surface of the recess is configured to be capable of being broken through and/or melted by the emissions, so that the fluid is discharged from the inside of the thermal management component.

In some embodiments, the bottom wall of the recess is configured to be capable of being broken through and/or melted by the emissions, so that the emissions pass through the thermal management component.

In the case of use of the recess, when the pressure relief mechanism is actuated, the emissions from the battery cell rush into the recess. Since the bottom wall of the recess is relatively weak, the emissions will damage the bottom wall of the recess and enter a collection chamber. In addition, the emissions rushing into the recess also melt the side face of the recess, so that the fluid is discharged from the inside of the thermal management component, thereby cooling the hot emissions.

In some embodiments, a radial dimension of the recess gradually decreases in a direction away from the pressure relief mechanism. This can increase the contact area with the emissions and facilitate the damage by the emissions.

In some embodiments, the bottom wall of the recess is provided with a weakened zone, the weakened zone being configured to be capable of being damaged by the emissions when the pressure relief mechanism is actuated, so that the emissions pass through the weakened zone.

The provision of the weakened zone facilitates the emissions passing through the thermal management component.

In some embodiments, the weakened zone has a thickness less than or equal to 3 mm.

In some embodiments, the weakened zone has a lower melting point than the rest of the thermal management component.

In some embodiments, the material of the weakened zone has a melting point below 400° C.

In some embodiments, the recess is provided in the first surface.

In some embodiments, the thermal management component comprises a first thermally conductive plate and a second thermally conductive plate, the first thermally conductive plate is located between the first wall and the second thermally conductive plate and attached to the first wall, a first region of the first thermally conductive plate is recessed toward the second thermally conductive plate to form the recess, and the first region is connected to the second thermally conductive plate.

In some embodiments, the first region is provided with a first through hole, and a radial dimension of the first through hole is smaller than that of the recess.

In some embodiments, a thickness of the second thermally conductive plate corresponding to the first through hole is smaller than that of the second thermally conductive plate in other regions. In this way, the weakened zone is more easily damaged by the emissions.

In some embodiments, the recess is configured as an avoidance chamber for enabling the pressure relief mechanism to be opened when the pressure relief mechanism is actuated.

The avoidance chamber provides a deformation space for the pressure relief mechanism, such that the pressure relief mechanism is deformed toward the thermal management component and fractured.

In some embodiments, a depth of the recess is related to a size of the pressure relief mechanism.

In some embodiments, the recess has a depth greater than 1 mm.

In some embodiments, the area of an opening of the recess is related to the area of the pressure relief mechanism.

In some embodiments, a ratio of an area of the opening of the recess to an area of the pressure relief mechanism ranges from 0.5 to 2.

In some embodiments, at least a portion of the pressure relief mechanism protrudes outward from the first wall, and the avoidance chamber is configured to accommodate the at least portion of the pressure relief mechanism.

In some embodiments, a portion of the first wall around the pressure relief mechanism protrudes outward, and the avoidance chamber is configured to accommodate an outward protruding portion of the first wall around the pressure relief mechanism.

In this way, the first wall of the battery cell can be closely attached to the surface of the thermal management component, which facilitates the fixation of the battery cell and can also save space and improve the thermal management efficiency. Moreover, when the pressure relief mechanism is actuated, the emissions from the battery cell can be discharged toward the avoidance chamber and away from the battery cell, thereby reducing the risk resulting from the emissions, so that the safety of the battery can be enhanced.

In some embodiments, the thermal management component is provided with a second through hole therein, the second through hole being configured such that emissions discharged from the battery cell can pass through the thermal management component via the second through hole when the pressure relief mechanism is actuated.

In some embodiments, a hole wall of the second through hole is configured to be capable of being damaged by the emissions, so that the fluid is discharged from the inside of the thermal management component.

In some embodiments, the hole wall of the second through hole is configured to be capable of being broken through and/or melted by the emissions, so that the fluid is discharged from the inside of the thermal management component.

When the pressure relief mechanism is actuated, the emissions from the battery cell rush into the second through hole. Since the emissions have high pressure and high temperature, the emissions further melt the hole wall of the second through hole when passing through the second through hole, so that the fluid is discharged from the inside of the thermal management component, thereby cooling the emissions.

In some embodiments, a radial dimension of the second through hole gradually decreases in a direction away from the pressure relief mechanism. This can increase the contact area with the emissions and facilitate the damage by the emissions.

In some embodiments, an area of an opening of the second through hole is related to an area of the pressure relief mechanism.

In some embodiments, a ratio of the area of the opening of the second through hole to the area of the pressure relief mechanism ranges from 0.5 to 2.

In some embodiments, at least a portion of the pressure relief mechanism protrudes from the first wall, and the second through hole is used to accommodate the at least portion of the pressure relief mechanism.

In this way, the first wall of the battery cell can be closely attached to the surface of the thermal management component, which facilitates the fixation of the battery cell and can also save space and improve the thermal management efficiency. Moreover, when the pressure relief mechanism is actuated, the emissions from the battery cell can be discharged toward the second through hole and away from the battery cell, thereby reducing the risk resulting from the emissions, so that the safety of the battery can be enhanced.

In some embodiments, a portion of the first wall around the pressure relief mechanism protrudes outward, and the second through hole is used to accommodate an outward protruding portion of the first wall around the pressure relief mechanism.

In some embodiments, the pressure relief mechanism is provided with a breaking device, the breaking device being used to damage the thermal management component when the pressure relief mechanism is actuated, so that the fluid is discharged from the inside of the thermal management component.

In some embodiments, the breaking device is a spike.

In some embodiments, the battery further comprises: an electrical chamber for accommodating a plurality of battery cells; and a collection chamber for collecting emissions discharged from the battery cells and emissions from the thermal management component when the pressure relief mechanism is actuated; wherein the thermal management component is configured to isolate the electrical chamber from the collection chamber.

The electrical chamber for accommodating the battery cells is separated from the collection chamber for collecting the emissions by means of the thermal management component. When the pressure relief mechanism is actuated, the emissions from the battery cell enter the collection chamber, rather than the electrical chamber or with a little thereof entering the electrical chamber, such that the electrical connections in the electrical chamber will not be affected, and the safety of the battery thus can be enhanced.

In some embodiments, the thermal management component has a wall shared by the electrical chamber and the collection chamber.

Since the thermal management component has the wall shared by the electrical chamber and the collection chamber, the emissions can be isolated from the electrical chamber as far as possible, thus reducing the risk resulting from the emissions and enhancing the safety of the battery.

In some embodiments, the battery further comprises: a protective member, the protective member being configured to protect the thermal management component, and the protective member and the thermal management component forming the collection chamber.

The collection chamber formed by the protective member and the thermal management component can effectively collect and buffer the emissions and reduce the risk resulting therefrom.

In some embodiments, the electrical chamber is isolated from the collection chamber by the thermal management component.

The collection chamber is not in communication with the electrical chamber, and liquid or gas, etc. in the collection chamber cannot enter the electrical chamber, so that the electrical chamber can be better protected.

In some embodiments, the thermal management component is configured to enable the emissions discharged from the battery cell to pass through the thermal management component and enter the collection chamber when the pressure relief mechanism is actuated.

In some embodiments, a second wall of the battery cell is provided with an electrode terminal, and the second wall is different from the first wall.

The pressure relief mechanism and the electrode terminals are provided on different walls of the battery cell, such that when the pressure relief mechanism is actuated, the emissions from the battery cell can be farther away from the electrode terminals, thereby reducing the impact of the emissions on the electrode terminals and a bus component and therefore enhancing the safety of the battery.

In some embodiments, the second wall is arranged opposite to the first wall.

In some embodiments, the pressure relief mechanism is a temperature-sensitive pressure relief mechanism configured to be capable of being melted when an internal temperature of the battery cell reaches a threshold; and/or the pressure relief mechanism is a pressure-sensitive pressure relief mechanism configured to be capable of being ruptured when an internal pressure of the battery cell reaches a threshold.

In a second aspect, a power consumption device is provided, comprising: a battery of the first aspect.

In some embodiments, the power consumption device is a vehicle, a ship or a spacecraft.

In a third aspect, a method for preparing a battery is provided, comprising: providing a battery cell comprising a pressure relief mechanism, the pressure relief mechanism being arranged in a first wall of the battery cell and the pressure relief mechanism being configured, when an internal pressure or temperature of the battery cell reaches a threshold, to be actuated to release the internal pressure; providing a thermal management component, the thermal management component being used to contain a fluid; and attaching a first surface of the thermal management component to the first wall, wherein the thermal management component can be damaged when the pressure relief mechanism is actuated, so that the fluid is discharged from inside of the thermal management component.

In some embodiments, the thermal management component can be damaged by emissions discharged from the battery cell when the pressure relief mechanism is actuated, so that the emissions pass through the thermal management component.

In some embodiments, the thermal management component is provided with a recess therein, and a bottom wall of the recess can be damaged by the emissions discharged from the battery cell when the pressure relief mechanism is actuated, so that the emissions pass through the thermal management component, and the side surface of the recess can be damaged by the emissions, so that the fluid is discharged from the inside of the thermal management component.

In some embodiments, the bottom wall of the recess is provided with a weakened zone, the weakened zone being configured to be capable of being damaged by emissions when the pressure relief mechanism is actuated, so that the emissions pass through the weakened zone.

In some embodiments, the thermal management component is provided with a second through hole, the emissions discharged from the battery cell can pass through the thermal management component via the second through hole when the pressure relief mechanism is actuated, and a hole wall of the second through hole can be damaged by the emissions, so that the fluid is discharged from inside of the thermal management component.

In a fourth aspect, a device for preparing a battery is provided, comprising a module for carrying out the method of the third aspect described above.

BRIEF DESCRIPTION OF THE DRAWINGS

The accompanying drawings described herein are intended to provide a further understanding of the present application, which constitute a part of the present application. The illustrative embodiments of the present application and the description thereof are for explaining the present application and do not constitute an undue limitation of the present application. In the drawings:

FIG. 3 is a schematic structural diagram of a battery module according to an embodiment of the present application;

FIG. 4 is an exploded view of a battery cell according to an embodiment of the present application;

FIG. 5 is an exploded view of a battery cell according to another embodiment of the present application;

FIGS. 10-17 are schematic structural diagrams of the battery according to some embodiments of the present application;

DESCRIPTION OF EMBODIMENTS

Figure 1:
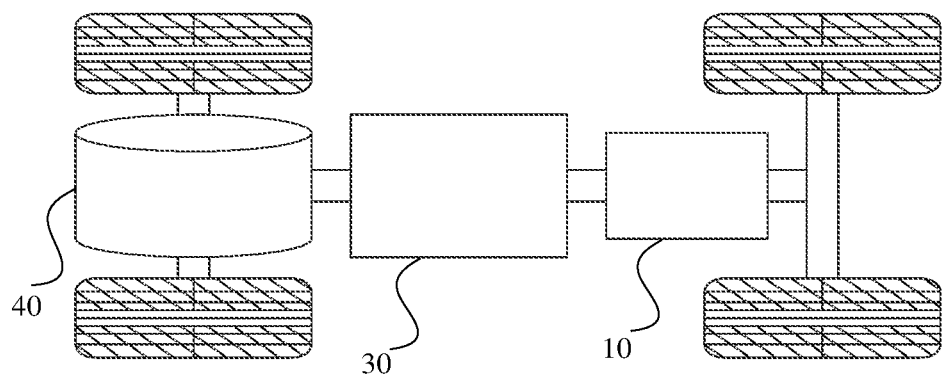
FIG. 1 is a schematic diagram of a vehicle according to an embodiment of the present application.

In order to make objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

In the present application, "a plurality of" means two or more (including two), similarly, "a plurality of groups" means two or more groups (including two groups), and "a plurality of sheets" means two or more sheets (including two sheets).

In the present application, a battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application. The battery cell may be cylindrical, flat, cuboid or in another shape, which is not limited by the embodiments of the present application. The battery cell is generally divided into three types according to the way of packaging: a cylindrical battery cell, a prismatic battery cell and a pouch battery cell, which is not limited by the embodiments of the present application.

A battery mentioned in the embodiments of the present application refers to a single physical module including one or more battery cells to provide a higher voltage and capacity. For example, the battery mentioned in the present application may include a battery module or a battery pack, etc. The battery generally includes a case for enclosing one or more battery cells. The case can prevent liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. Taking a lithium-ion battery as an example, the material of the positive electrode current collector may be aluminum, and the positive electrode active material may be lithium cobalt oxides, lithium iron phosphate, ternary lithium or lithium manganate, etc. The negative electrode sheet includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative electrode tab. The material of the negative electrode current collector may be copper, and the negative electrode active material may be carbon or silicon, etc. In order to ensure that no fusing occurs when a large current passes, there are a plurality of positive electrode tabs which are stacked together, and there are a plurality of negative electrode tabs which are stacked together. The material of the isolation film may be PP or PE, etc. In addition, the electrode assembly may have a coiled structure or a laminated structure, and the embodiments of the present application are not limited thereto. With the development of the battery technology, it is necessary to consider many design factors, such as energy density, cycle life, discharge capacity, C-rate and other performance parameters. In addition, the safety of the battery should also be considered.

With respect to the battery cell, the main safety hazards come from the charging and discharging processes, and a suitable environmental temperature design is also required. In order to effectively avoid unnecessary losses, at least triple protection measures are generally taken for the battery cell. Specifically, the protection measures include at least a switching element, a properly selected isolation film material and a pressure relief mechanism. The switching element refers to an element that can stop the charging or discharging of the battery when the temperature or resistance in the battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism refers to an element or component that is actuated to release an internal pressure or temperature when the internal pressure or temperature of the battery cell reaches a predetermined threshold. The threshold design is different according to different design requirements. The threshold may depend on the material of one or more of the positive electrode sheet, the negative electrode sheet, the electrolytic solution and the isolation film in the battery cell. The pressure relief mechanism may take the form of an anti-explosion valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for releasing the internal pressure or temperature.

The "actuation" mentioned in the present application means that the pressure relief mechanism acts or is activated to a certain state, such that the internal pressure and temperature of the battery cell can be released. The action executed by the pressure relief mechanism may include but is not limited to: at least a portion of the pressure relief mechanism being fractured, broken, torn or opened, etc. When the pressure relief mechanism is actuated, high-temperature and high-pressure substances inside the battery cell are discharged outwards from an actuated position as emissions. In this way, the pressure and temperature in the battery cell can be released at a controllable pressure or temperature, thereby avoiding potentially more serious accidents.

The emissions from the battery cell mentioned in the present application include but are not limited to: the electrolytic solution, dissolved or split positive and negative electrode sheets, fragments of the isolation film, high-temperature and high-pressure gas generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high temperature inside the battery cell, i.e., to discharge the emissions to the outside of the battery cell. However, in order to ensure an output voltage or current of the battery, a plurality of battery cells are often required and electrically connected to each other via a bus component. The emissions discharged from the interior of a battery cell may cause short circuit of the other battery cells. For example, when discharged metal scraps electrically connect two bus components, the battery may be short-circuited, thereby posing a potential safety hazard. Moreover, the high-temperature and high-pressure emissions are discharged in a direction of the pressure relief mechanism provided in the battery cell, and more specifically, may be discharged in a direction of a region where the pressure relief mechanism is actuated. The strength and destructive power of such emissions may be great, or may even be enough to break through one or more structures in this direction, causing further safety problems.

In view of this, the embodiments of the application provide a technical solution in which a wall of the battery cell provided with the pressure relief mechanism is attached to the thermal management component, and the thermal management component is damaged by means of the actuation of the pressure relief mechanism, so that a fluid inside the thermal management component is discharged and may cool down the emissions to reduce the risk caused by the emissions, thereby enhancing the safety of the battery.

The thermal management component is configured to accommodate a fluid to adjust temperatures of a plurality of battery cells. The fluid here may be liquid or gas, and temperature adjustment means heating or cooling the plurality of battery cells. In the case of cooling or lowering the temperatures of the battery cells, the thermal management component is configured to accommodate a cooling fluid to lower the temperatures of the plurality of battery cells. In this case, the thermal management component may also be called a cooling component, a cooling system or a cooling plate, etc. The fluid accommodated by the thermal management component may also be called a cooling medium or a cooling fluid, and more specifically, may be called a cooling liquid or a cooling gas. In addition, the thermal management component can also be used for heating to raise the temperatures of the plurality of battery cells, which is not limited by the embodiments of the present application. Optionally, the fluid can flow in a circulating manner to achieve better temperature adjustment effects. Optionally, the fluid may be water, a mixture of water and ethylene glycol, or air, etc.

The electrical chamber mentioned in the present application is used to accommodate multiple battery cells and a bus component. The electrical chamber may be sealed or unsealed. The electrical chamber provides an installation space for the battery cells and the bus component. In some embodiments, a structure configured to fix the battery cells may also be provided in the electrical chamber. The shape of the electrical chamber may be determined according to the plurality of battery cells and the bus component which are accommodated therein. In some embodiments, the electrical chamber may be a cube with six walls. Since the battery cells in the electrical chamber form higher voltage output through electrical connection, the electrical chamber may also be called a "high-voltage chamber".

The bus component mentioned in the present application is used to realize the electrical connection between the plurality of battery cells, such as parallel or series connection or parallel-series connection. The bus component may implement the electrical connection between the battery cells by connecting electrode terminals of the battery cells.

In some embodiments, the bus component may be fixed to the electrode terminals of the battery cells by means of welding. Corresponding to the "high-voltage chamber", the electrical connection formed by the bus component may also be called "high-voltage connection".

The collection chamber mentioned in the present application is used to collect the emissions and can be sealed or non-sealed. In some embodiments, the collection chamber may contain air or another gas. In the collection chamber there is no electrical connection to the voltage output. Corresponding to the "high-voltage chamber", the collection chamber may also be called a "low-voltage chamber". Optionally, or additionally, the collection chamber may also contain liquid, such as a cooling medium, or a component for accommodating the liquid may also be provided in the collection chamber to further cool the emissions entering the collection chamber. Further, optionally, the gas or the liquid in the collection chamber flows in a circulating manner.

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing apparatuses, but also applicable to all apparatuses using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel vehicle, a gas vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 can be used not only as an operation power supply of the vehicle 1, but also as a driving power supply of the vehicle 1, replacing or partially replacing fuel or natural gas to provide driving power for the vehicle 1.

In order to meet different power requirements, the battery may include a plurality of battery cells, wherein the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form battery modules, and then the multiple battery modules are connected in series, in parallel or in series and parallel to form a battery. That is, a plurality of battery cells may directly form a battery, or may first form battery modules, and then the battery modules form a battery.

Figure 2:
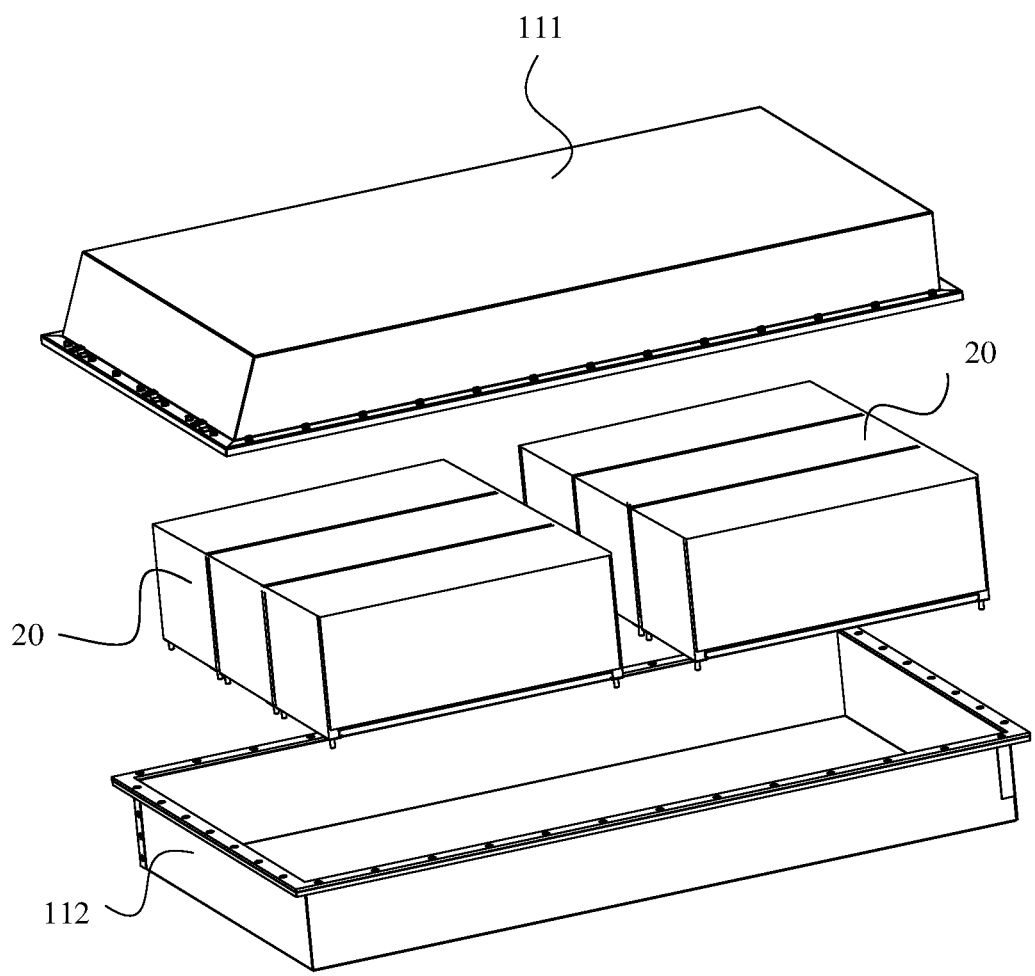
FIG. 2 is a schematic structural diagram of a battery according to an embodiment of the present application.

For example, as shown in FIG. 2, which is a schematic structural diagram of a battery 10 according to an embodiment of the present application, the battery 10 may include a plurality of battery cells 20. The battery 10 may further include a case (or a covering) with the interior thereof being a hollow structure, and the plurality of battery cells 20 are accommodated in the case. As shown in FIG. 2, the case may include two portions, which are referred to as a first portion 111 and a second portion 112, respectively, and the first portion 111 and the second portion 112 are fastened together. The shapes of the first portion 111 and the second portion 112 may be determined according to the shape of the combined plurality of battery cells 20, and the first portion 111 and the second portion 112 may each have an opening. For example, the first portion 111 and the second portion 112 each may be a hollow cuboid and each have only one surface with an opening, and the opening of the first portion 111 is arranged opposite to the opening of the second portion 112. The first portion 111 and the second portion 112 are fastened to each other to form a case with a closed chamber. The plurality of battery cells 20 are combined in parallel connection or series connection or series-parallel connection and are then placed in the case formed by fastening the first portion 111 to the second portion 112.

Optionally, the battery 10 may also include other structures, which will not be described in detail herein. For example, the battery 10 may also include a bus component. The bus component is configured to implement the electric connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism passing through the case. Optionally, the electrically conductive mechanism may also belong to the bus component.

According to different power requirements, the number of the battery cells 20 may be set to any value. The plurality of battery cells 20 can be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of the battery cells 20 included in the battery module is not limited and may be set as required. For example, FIG. 3 shows an example of a battery module. The battery may include a plurality of battery modules, and these battery modules may be connected in series, in parallel or in series and parallel.

FIG. 4 is a schematic structural diagram of a battery cell 20 according to an embodiment of the present application. The battery cell 20 includes one or more electrode assemblies 22, a housing 211 and a cover plate 212. The coordinate system shown in FIG. 4 is the same as that in FIG. 3. The housing 211 and the cover plate 212 form a shell or a battery box 21. A wall of the housing 211 and the cover plate 212 are each referred to as a wall of the battery cell 20. The housing 211 is shaped according to the shape of one or more electrode assemblies 22 after combination. For example, the housing 211 may be a hollow cuboid or cube or cylinder, and one surface of the housing 211 has an opening such that one or more electrode assemblies 22 can be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connecting member 23 also called a current collecting member 23, which is located between the cover plate 212 and the electrode assembly 22 and configured to electrically connect the electrode assembly 22 to the electrode terminal 214.

As shown in FIG. 4, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of one or more electrode assemblies 22 is connected to one electrode terminal via one connecting member 23, and the second electrode tab 222a of one or more electrode assemblies 22 is connected to the other electrode terminal via the other connecting member 23. For example, the positive electrode terminal 214a is connected to the positive electrode tab via one connecting member 23, and the negative electrode terminal 214b is connected to the negative electrode tab via the other connecting member 23.

In this battery cell 20, according to actual use requirements, there may be a single or a plurality of electrode assemblies 22. As shown in FIG. 4, there are four separate electrode assemblies 22 in the battery cell 20.

A schematic structural diagram of a battery cell 20 including a pressure relief mechanism 213 according to another embodiment of the present application is shown in FIG. 5.

The housing 211, the cover plate 212, the electrode assembly 22 and the connecting member 23 in FIG. 5 are consistent with the housing 211, the cover plate 212, the electrode assembly 22 and the connecting member 23 in FIG. 4, which will not be repeated here for brevity.

One wall of the battery cell 20, such as a first wall 21a shown in FIG. 5, may be further provided with a pressure relief mechanism 213. For convenience of display, the first wall 21a is separated from the housing 211 in FIG. 5, but this does not specify that a bottom side of the housing 211 has an opening. The pressure relief mechanism 213 is configured, when an internal pressure or temperature of the battery cell 20 reaches a threshold, to be actuated to release the internal pressure or temperature.

The pressure relief mechanism 213 may be a portion of the first wall 21a or is split from the first wall 21a and fixed to the first wall 21a by means of welding, for example. When the pressure relief mechanism 213 is a portion of the first wall 21a, e.g., the pressure relief mechanism 213 can be formed by providing an indentation on the first wall 21a, and the thickness of the first wall 21a corresponding to the indentation is smaller than that of other regions of the pressure relief mechanism 213 except the indentation. The indentation is the weakest position of the pressure relief mechanism 213. When excessive gas generated by the battery cell 20 causes the internal pressure of the housing 211 to rise and reach a threshold, or the internal temperature of the battery cell 20 rises and reaches a threshold due to the heat generated by the internal reaction of the battery cell 20, the pressure relief mechanism 213 can be fractured at the indentation, resulting in the communication between the inside and outside of the housing 211. The gas pressure and temperature are released outward through the cracking of the pressure relief mechanism 213, thereby preventing the battery cell 20 from exploding.

Optionally, in an embodiment of the present application, as shown in FIG. 5, in the case where the pressure relief mechanism 213 is provided at the first wall 21a of the battery cell 20, a second wall of the battery cell 20 is provided with electrode terminals 214 and is different from the first wall 21a.

Optionally, the second wall is arranged opposite to the first wall 21a. For example, the first wall 21a may be a bottom wall of the battery cell 20, and the second wall may be a top wall of the battery cell 20, i.e., the cover plate 212.

Optionally, as shown in FIG. 5, the battery cell 20 may also include a backing plate 24. The backing plate 24 is located between the electrode assembly 22 and the bottom wall of the housing 211, can support the electrode assembly 22, and can also effectively prevent the electrode assembly 22 from interfering with rounded corners around the bottom wall of the housing 211. In addition, the backing plate 24 may be provided with one or more through holes, e.g., the backing plate may be provided with a plurality of uniformly arranged through holes, or when the pressure relief mechanism 213 is provided on the bottom wall of the housing 211, through holes are formed at positions corresponding to the pressure relief mechanism 213 for facilitating the guiding of liquid and gas. Specifically, this can communicate spaces of an upper surface and a lower surface of the backing plate 24, and gas generated inside the battery cell 20 and the electrolytic solution can freely pass through the backing plate 24.

The pressure relief mechanism 213 and the electrode terminals 214 are provided on different walls of the battery cell 20, such that when the pressure relief mechanism 213 is actuated, the emissions from the battery cell 20 can be farther away from the electrode terminals 214, thereby reducing the impact of the emissions on the electrode terminals 214 and the bus component and therefore enhancing the safety of the battery.

Further, when the electrode terminals 214 are provided on the cover plate 212 of the battery cell 20, the pressure relief mechanism 213 is provided on the bottom wall of the battery cell 20, such that when the pressure relief mechanism 213 is actuated, the emissions from the battery cell 20 can are discharged to the bottom of the battery 10. In this way, the risk resulting from the emissions can be reduced by using the thermal management component at the bottom of the battery 10, and the harm to users can be reduced because the bottom of the battery 10 is usually far away from the users.

The pressure relief mechanism 213 may have various possible pressure relief structures, which is not limited by the embodiments of the present application. For example, the pressure relief mechanism 213 may be a temperature-sensitive pressure relief mechanism configured to be capable of being melted when the internal temperature of the battery cell 20 provided with the pressure relief mechanism 213 reaches a threshold; and/or the pressure relief mechanism 213 may be a pressure-sensitive pressure relief mechanism configured to be capable of being fractured when the internal gas pressure of the battery cell 20 provided with the pressure relief mechanism 213 reaches a threshold.

Figure 6:
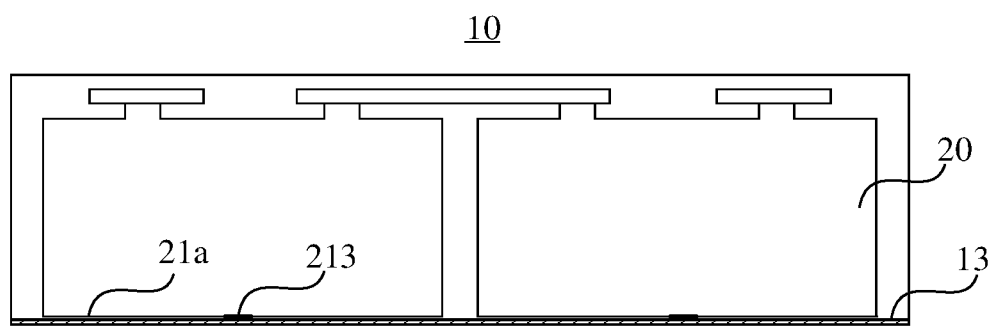
FIGS. 6 and 7 are schematic structural diagrams of the structure of the battery according to some embodiments of the present application.

FIG. 6 is a schematic diagram of a battery 10 according to an embodiment of the present application. As shown in FIG. 6, the battery 10 may include the battery cell 20 and the thermal management component 13.

The battery cell 20 includes the pressure relief mechanism 213, the pressure relief mechanism 213 is arranged in the first wall 21*a* of the battery cell 20, and the pressure relief mechanism 213 is configured, when the internal pressure or temperature of the battery cell 20 reaches a threshold, to be actuated to release the internal pressure or temperature. For example, the battery cell 20 may be the battery cell 20 in FIG. 5.

The thermal management component 13 is configured to accommodate a fluid to adjust the temperature of the plurality of battery cells 20. In the case of lowering the temperature of the battery cells 20, the thermal management component 13 may accommodate a cooling medium to adjust the temperature of the plurality of battery cells 20. In this case, the thermal management component 13 may also be called a cooling component, a cooling system or a cooling plate, etc. In addition, the thermal management component 13 can also be used for heating, which is not limited by the embodiments of the present application. Optionally, the fluid can flow in a circulating manner to achieve better temperature adjustment effects.

A first surface of the thermal management component 13 (an upper surface shown in FIG. 6) is attached to the first wall 21*a*. That is, the wall of the battery cell 20 provided with the pressure relief mechanism 213 is attached to the thermal management component 13. The thermal management component 13 is configured to be capable of being damaged when the pressure relief mechanism 213 is actuated, so that the fluid is discharged from the inside of the thermal management component 13.

In an embodiment of the present application, the first surface of the thermal management component 13 is attached to the first wall 21*a* provided with the pressure relief mechanism 213 therein. As such, when the pressure relief mechanism 213 is actuated, the emissions from the battery cell 20 are discharged toward the thermal management component 13. Also, the thermal management component 13 is configured to be capable of being damaged when the pressure relief mechanism 213 is actuated, so that the fluid is discharged from the inside of the thermal management component 13. As such, the fluid can absorb the heat from the battery cell 20, and reduces the temperature of the emissions. Due to the cooling of the fluid, the temperature of the emissions from the battery cell 20 may be reduced rapidly, so that the risk caused by the abnormality of a single battery cell 20 can be suppressed in the first time, the possibility of battery explosion can be reduced, and the safety of the battery can be enhanced.

Optionally, in an embodiment of the application, the thermal management component 13 may further be configured to be capable of being damaged by the emissions discharged from the battery cell 20 when the pressure relief mechanism 213 is actuated, so that the emissions pass through the thermal management component 13.

Specifically, when the pressure relief mechanism 213 is actuated, on the one hand, the emissions discharged from the battery cell 20 may damage the thermal management component 13 and pass through the thermal management component 13 to move away from the battery cell 20, and on the other hand, the fluid is discharged from the inside of the thermal management component 13 while cooling the hot emissions. Since the temperature of the emissions is very high, no matter whether the fluid is used to heat or cool the battery cell 20, the temperature of the fluid is lower than the temperature of the emissions, so that the emissions can be cooled. As such, the emissions may be cooled on the one hand, and are drained away through the thermal management component 13 on the other hand, and the risk caused thereby is reduced as much as possible, allowing for enhancing the safety of the battery.

In the embodiments of the present application, various possible ways can be used to allow the thermal management component 13 to be damaged when the pressure relief mechanism 213 is actuated, as described below by way of examples.

Figure 7:
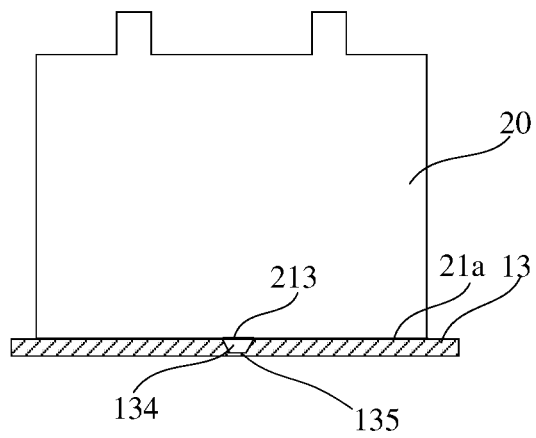

Optionally, as shown in FIG. 7, in an embodiment of the present application, the thermal management component 13 is provided with a recess 134 therein, and a side surface of the recess 134 is configured to be capable of being damaged by the emissions discharged from the battery cell 20, so that the fluid is discharged from the inside of the thermal management component 13. For example, the side surface of the recess 134 is configured to be capable of being broken through and/or melted by the emissions, so that the fluid is discharged from the inside of the thermal management component 13.

Optionally, in an embodiment of the present application, a bottom wall of the recess 134 is configured to be damaged by the emissions when the pressure relief mechanism 213 is actuated, so that the emissions pass through the thermal management component 13. For example, the bottom wall of the recess 134 is configured to be capable of being broken through and/or melted by the emissions, so that the emissions pass through the thermal management component 13.

In the case of use of the recess 134, when the pressure relief mechanism 213 is actuated, the emissions from the battery cell 20 rush into the recess 134. Since the bottom wall of the recess 134 is relatively weak, the emissions will damage the bottom wall of the recess 134 and pass through the thermal management component 13. In addition, the emissions rushing into the recess 134 also melt the side face of the recess 134, so that the fluid is discharged from the inside of the thermal management component 13, thereby cooling the hot emissions.

Optionally, in an embodiment of the present application, the radial dimension of the recess 134 gradually decreases in a direction away from the pressure relief mechanism 213. That is, the side face of the recess 134 is an inclined plane. This can increase the contact area with the emissions and facilitate the damage by the emissions. For example, an inclination angle of the side face of the recess 134 (an included angle between the side face and the plane where the bottom wall is located) may be in the range from 15° to 85°.

Optionally, as shown in FIG. 7, in an embodiment of the present application, in order to facilitate passage of the emissions through the thermal management component 13, the bottom wall of the recess 134 is provided with a weakened zone 135, and the weakened zone 135 is configured to be damaged by the emissions when the pressure relief mechanism 213 is actuated, so that the emissions pass through the weakened zone 135.

Optionally, the weakened zone 135 may be arranged opposite to the pressure relief mechanism 213. As such, when the pressure relief mechanism 213 is actuated, the emissions can directly impact on the weakened zone to open the weakened zone 135.

The weakened zone 135 can adopt various arrangements that facilitate damage by the emissions, which is not limited by the embodiments of the present application.

Optionally, the recess 134 may be provided in the first surface, that is, the recess 134 is provided in a surface of the thermal management component 13 facing the first wall 21a. That is, an opening surface of the recess 134 faces the first wall 21a.

It should be understood that the opening of the recess 134 may also face away from the first wall 21a. In this case, the bottom wall of the recess 134 is also easily damaged by the emissions.

The thermal management component 13 can form a fluid flow channel from a thermally conductive material. The fluid flows in the flow channel, and conducts heat through the thermally conductive material to adjust the temperature of the battery cell 20. Optionally, the weakened zone may only have the thermally conductive material and no fluid to form a relatively thin thermally conductive material layer, which is easily damaged by the emissions. For example, the bottom wall of the recess 134 may be a thin thermally conductive material layer to form the weakened zone 135.

Figure 8A:
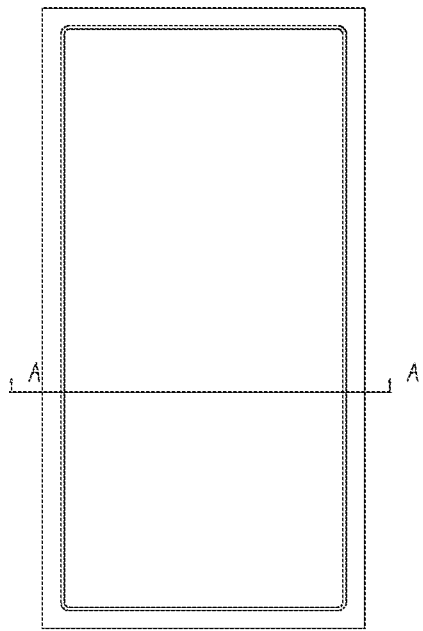
FIG. 8a is a schematic plan view of the battery according to an embodiment of the present application.
Figure 8B:
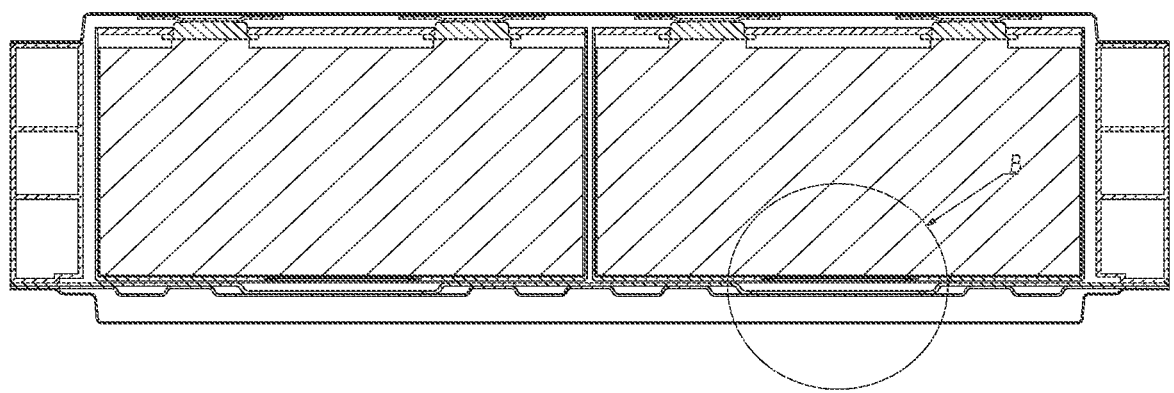
FIG. 8b is a schematic diagram of a cross section of the battery shown in FIG. 8a taken along the line A-A.
Figure 8C:
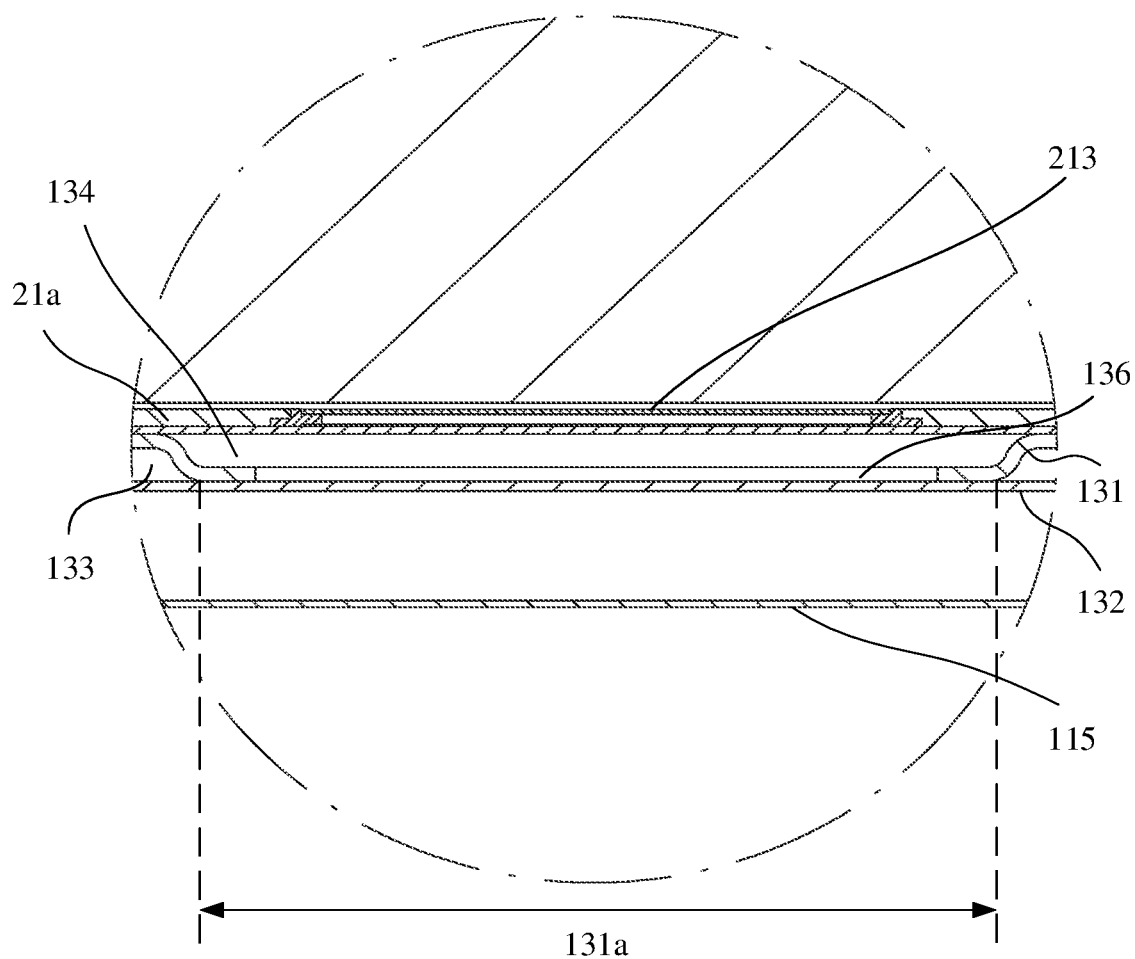
FIG. 8c is an enlarged view of a part B of the battery shown in FIG. 8b.

Optionally, as shown in FIGS. 8a to 8c, in an embodiment of the present application, the thermal management component 13 may include a first thermally conductive plate 131 and a second thermally conductive plate 132. The first thermally conductive plate 131 and the second thermally conductive plate 132 form a flow channel 133 for accommodating a fluid. The first thermally conductive plate 131 is located between the first wall 21a and the second thermally conductive plate 132 and is attached to the first wall 21a. A first region 131a of the first thermally conductive plate 131 is recessed toward the second thermally conductive plate 132 to form a recess 134, and the first region 131a is connected to the second thermally conductive plate 132. In this way, a flow channel 133 is formed around the recess 134, while no flow channel is formed in the bottom wall of the recess 134, thus forming a weakened zone.

Optionally, the first thermally conductive plate 131 or the second thermally conductive plate 132 at the bottom wall of the recess 134 may also be removed to form a thinner weakened zone. For example, as shown in FIG. 8c, in an embodiment of the present application, the first region 131a is provided with a first through hole 136, and a radial dimension of the first through hole 136 is smaller than that of the recess 134. That is, the first thermally conductive plate 131 at the bottom wall of the recess 134 is removed, and the connection between the first thermally conductive plate 131 and the second thermally conductive plate 132 is remained at the bottom edge of the recess 134 to form a flow channel 133 around the recess 134.

Optionally, the second thermally conductive plate 132 corresponding to the first through hole 136 may also be thinned. That is, the thickness of the second thermally conductive plate 132 corresponding to the first through hole 136 is smaller than that of the second thermally conductive plate 132 in other regions, such that the weakened zone is more easily damaged by the emissions. Optionally, a weakened recess may also be provided on the second thermally conductive plate 132 corresponding to the first through hole 136.

Figure 9A:
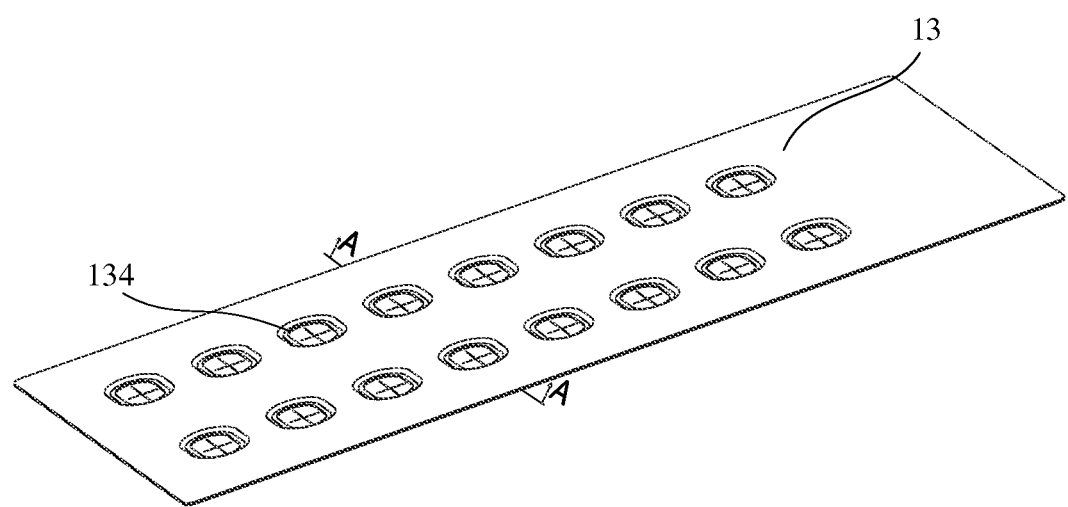
FIG. 9a is a schematic perspective view of a thermal management component according to an embodiment of the present application.
Figure 9B:
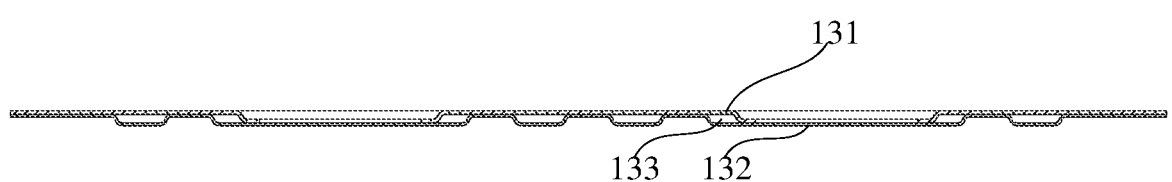
FIG. 9b is a schematic cross-sectional diagram of the thermal management component of FIG. 9a taken along A-A.
Figure 9C:
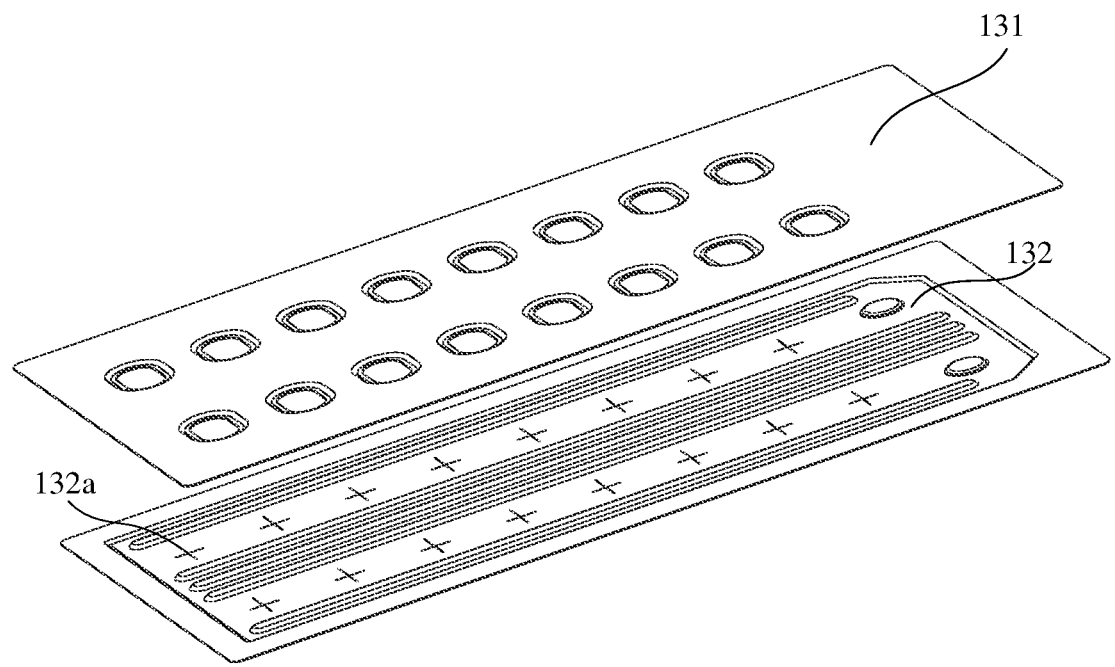
FIG. 9c is an exploded view of a thermal management component according to an embodiment of the present application.

FIGS. 9a to 9c show schematic diagrams of the thermal management component 13. As shown in FIGS. 9a to 9c, the first thermally conductive plate 131 is recessed to form a recess 134, and a region of the second thermally conductive plate 132 corresponding to the recess 134 has no flow channel and is provided with a weakened recess 132a. In this way, after the first thermally conductive plate 131 and the second thermally conductive plate 132 are connected to each other, a weakened zone is formed at the bottom wall of the recess 134.

It should be understood that the bottom wall of the recess 134 can be thinned by other thinning methods. For example, a blind hole or a stepped hole may be formed in the first region 131a of the first thermally conductive plate 131; and/or a blind hole is formed in the second thermally conductive plate 132.

Optionally, in an embodiment of the present application, the weakened zone 135 has a thickness less than or equal to 3 mm. For example, the weakened zone 135 may have a thickness of 1 mm or less.

In addition to the weakened zone 135 with a smaller thickness, a weakened zone 135 made of a low-melting-point material may also be used to facilitate the melting thereof by the emissions. That is, the weakened zone 135 can have a lower melting point than the rest of the thermal management component 13. For example, the material of the weakened zone 135 has a melting point below 400° C.

It should be understood that the weakened zone 135 may be configured to be made of a low-melting-point material and have a smaller thickness. That is, the foregoing two implementations may be implemented alone or in combination.

When actuated, the pressure relief mechanism 213 is deformed to communicate the inside and outside of the battery cell 20. For example, with respect to the pressure relief mechanism 213 using an indentation, when actuated, the pressure relief mechanism 213 is fractured at the indentation and opened toward two sides. Accordingly, the pressure relief mechanism 213 needs a certain deformation space. In an embodiment of the present application, the recess 134 is configured as an avoidance chamber for enabling the pressure relief mechanism 213 to be opened when the pressure relief mechanism 213 is actuated. The avoidance chamber provides a deformation space for the pressure relief mechanism 213, such that the pressure relief mechanism 213 is deformed toward the thermal management component 13 and fractured.

In the case of being used as an avoidance chamber, the recess 134 should be arranged such that it meets the condition that the pressure relief mechanism 213 can be opened when actuated. Specifically, a depth of the recess 134 is related to a size of the pressure relief mechanism 213. As an embodiment of the present application, the recess 134 has a depth greater than 1 mm. For example, the recess 134 may have a depth of 3 mm or more than 3 mm, so as to further facilitate the opening of the pressure relief mechanism 213. An area of the opening of the recess 134 is also related to an area of the pressure relief mechanism 213. In order that the pressure relief mechanism 213 can be opened, a ratio of the area of the opening of the recess 134 to the area of the pressure relief mechanism 213 needs to be greater than a certain value. In addition, in order to facilitate the damage to the side face of the recess 134 by the emissions, the ratio of the area of the opening of the recess 134 to the area of the pressure relief mechanism 213 also needs to be less than a certain value. For example, the ratio of the area of the opening of the recess 134 to the area of the pressure relief mechanism 213 may range from 0.5 to 2.

Figures 10, 11:
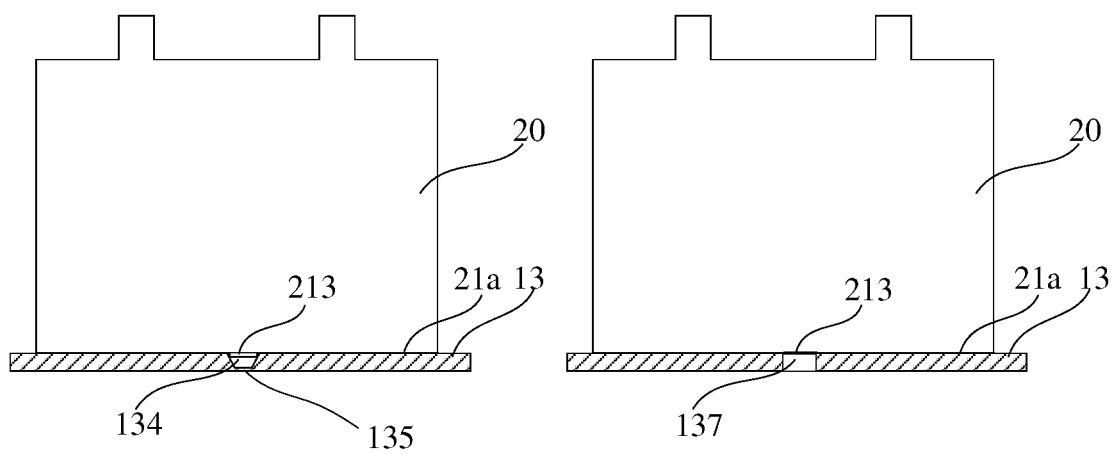

When the pressure relief mechanism 213 is provided at the first wall 21a of the battery cell 20, at least a portion of the pressure relief mechanism 213 may protrude outward from the first wall 21a. This can facilitate the installation of the pressure relief mechanism 213 and ensure the internal space of the battery cell 20. Optionally, as shown in FIG. 10, in an embodiment of the present application, in the case where at least a portion of the pressure relief mechanism 213 protrudes outward from the first wall 21a, the avoidance chamber may be configured to accommodate the at least portion of the pressure relief mechanism 213. In this way, the first wall 21a of the battery cell 20 can be closely attached to the surface of the thermal management component 13, which facilitates the fixation of the battery cell 20 and can also save space and improve the thermal management efficiency. Moreover, when the pressure relief mechanism 213 is actuated, the emissions from the battery cell 20 can be discharged toward the avoidance chamber and away from the battery cell 20, thereby reducing the risk resulting from the emissions, so that the safety of the battery can be enhanced.

Optionally, in an embodiment of the present application, a portion of the first wall 21a around the pressure relief mechanism 213 protrudes outward, and the avoidance chamber is configured to accommodate the outward protruding portion of the first wall 21a around the pressure relief mechanism 213. Similarly, in the case where the portion of the first wall 21a around the pressure relief mechanism 213 protrudes outward, the avoidance chamber can ensure that the first wall 21a of the battery cell 20 can be closely attached to the surface of the thermal management component 13, which facilitates the fixation of the battery cell 20 and can also save space and improve the thermal management efficiency.

In the above embodiments, provision of the recess 134 makes it possible for the thermal management component 13 to be damaged when the pressure relief mechanism 213 is actuated. In addition to the recess 134, a through hole may also be provided to make it possible for the thermal management component 13 to be damaged when the pressure relief mechanism 213 is actuated.

Optionally, as shown in FIG. 11, in an embodiment of the present application, the thermal management component 13 is provided with a second through hole 137, and the second through hole 137 is configured such that the emissions discharged from the battery cell 20 can pass through the thermal management component 13 via the second through hole 137 when the pressure relief mechanism 213 is actuated.

Optionally, the second through hole 137 may be arranged opposite to the pressure relief mechanism 213. As such, when the pressure relief mechanism 213 is actuated, the emissions may directly pass through thermal management component 13 via the second through hole 137.

Optionally, in an embodiment of the present application, in the case of provision of the second through hole 137, the part of the thermal management component 13 around the second through hole 137 can be damaged by the emissions from the battery cell 20, so that the fluid is discharged from the inside of the thermal management component 13.

Specifically, when the pressure relief mechanism 213 is actuated, the emissions from the battery cell 20 pass through thermal management component 13 via the second through hole 137. In addition, the emissions also damage portions around the second through hole 137. For example, the hot emissions melt the surrounding thermal management component 13, so that the fluid is discharged from the inside of the thermal management component 13, thereby cooling the hot emissions.

Optionally, in an embodiment of the present application, the hole wall of the second through hole 137 is configured to be capable of being damaged by the emissions, so that the fluid is discharged from the inside of the thermal management component 13.

When the pressure relief mechanism 213 is actuated, the emissions from the battery cell 20 rush into the second through hole 137. Since the emissions have high pressure and high temperature, the emissions further melt the hole wall of the second through hole 137 when passing through the second through hole 137, so that the fluid is discharged from the inside of the thermal management component 13, thereby cooling the emissions.

Optionally, the radial dimension of the second through hole 137 gradually decreases in the direction away from the pressure relief mechanism 213. That is, the hole wall of the second through hole 137 is an inclined plane. This can increase the contact area with the emissions and facilitate the damage by the emissions.

Optionally, similar to the foregoing recess 134, the second through hole 137 should also be arranged such that it meets the condition that the pressure relief mechanism 213 can be opened when actuated. As an embodiment of the present application, an area of an opening of the second through hole 137 is related to an area of the pressure relief mechanism 213. In order that the pressure relief mechanism 213 can be opened, a ratio of the area of the opening of the second through hole 137 to the area of the pressure relief mechanism 213 needs to be greater than a certain value. In addition, in order to facilitate damage to the hole wall of the second through hole 137 by the emissions, the ratio of the opening area of the second through hole 137 to the area of the pressure relief mechanism 213 should also be less than a certain value. For example, the ratio of the area of the opening of the second through hole 137 to the area of the pressure relief mechanism 213 ranges from 0.5 to 2.

Optionally, in an embodiment of the present application, the pressure relief mechanism 213 is arranged in the first wall 21a of the battery cell 20 provided with the pressure relief mechanism 213, the first wall 21a is attached to thermal management component 13, at least a portion of the pressure relief mechanism 213 protrudes outward from the first wall 21a, and the second through hole 137 is used to accommodate the at least portion of the pressure relief mechanism 213. In this way, the first wall 21a of the battery cell 20 can be closely attached to the surface of the thermal management component 13, which facilitates the fixation of the battery cell 20 and can also save space and improve the thermal management efficiency. Moreover, when the pressure relief mechanism 213 is actuated, the emissions from the battery cell 20 can be discharged toward the second through hole 137 and away from the battery cell 20, thereby reducing the risk resulting from the emissions, so that the safety of the battery can be enhanced.

Optionally, in an embodiment of the present application, a portion of the first wall 21a around the pressure relief mechanism 213 protrudes outward, and the second through hole 137 is configured to accommodate an outward protruding portion of the first wall 21a around the pressure relief mechanism 213. In the case that the portion of the first wall 21a around the pressure relief mechanism 213 protrudes outward, the second through hole 137 may ensure that the first wall 21a of the battery cell 20 may be closely attached to the surface of the thermal management component 13, which is easy to fix the battery cell 20, saves space and improves the thermal management efficiency.

It should be understood that, in addition to providing the thermal management component 13 with a structure such that the thermal management component 13 can be damaged when the pressure relief mechanism 213 is actuated, the pressure relief mechanism 213 may be also provided with a structure that enables the thermal management component 13 to be damaged when the pressure relief mechanism 213 is actuated.

Optionally, in an embodiment of the present application, the pressure relief mechanism 213 is provided with a breaking device. The breaking device is configured to damage the thermal management component 13 when the pressure relief mechanism 213 is actuated, such that the fluid is discharged from the inside of the thermal management component 13. For example, the breaking device may be a spike, but this is not limited by the embodiment of the present application.

Optionally, in an embodiment of the present application, as shown in FIG. 12, the battery 10 may further include an electrical chamber 11a and a collection chamber 11b. The thermal management component 13 is configured to isolate the electrical chamber 11a from the collection chamber 11b. The so-called "isolate" here refers to separate, which may or may not be sealed.

The electrical chamber 11a is used to accommodate a plurality of the battery cells 20. The electrical chamber 11a may also be used to accommodate the bus component 12. The electrical chamber 11a provides an accommodation space for the battery cells 20 and the bus component 12, and the electrical chamber 11a may be shaped according to the plurality of battery cells 20 and the bus component 12.

The bus component 12 is configured to electrically connect the plurality of battery cells 20. The bus component 12 may implement the electrical connection between the battery cells 20 by connecting electrode terminals 214 of the battery cells 20.

The collection chamber 11b is used to collect the emissions discharged from the battery cell 20 and the emissions from the thermal management component 13 when the pressure relief mechanism 213 is actuated.

In the embodiment of the present application, the thermal management component 13 is used to isolate the electrical chamber 11a from the collection chamber 11b. That is, the electrical chamber 11a for accommodating the plurality of battery cells 20 and the bus component 12 is separated from the collection chamber 11b for collecting the emissions. In this way, when the pressure relief mechanism 213 is actuated, the emissions from the battery cells 20 enter the collection chamber 11b rather than the electrical chamber, or a small amount of emissions enter the electrical chamber 11a, so that the electrical connection in the electrical chamber 11a is not affected, and therefore the safety of the battery can be enhanced.

Optionally, in an embodiment of the application, the thermal management component 13 is configured to make it possible for the emissions discharged from the battery cell 20 to pass through the thermal management component 13 and enter the collection chamber 11b when the pressure relief mechanism 213 is actuated.

Optionally, in an embodiment of the present application, the thermal management component 13 has a wall shared by the electrical chamber 11a and the collection chamber 11b. As shown in FIG. 12, the thermal management component 13 may be both a wall of the electrical chamber 11a and a wall of the collection chamber 11b. That is, the thermal management component 13 (or a portion thereof) can be directly used as a wall shared by the electrical chamber 11a and the collection chamber 11b. In this way, the emissions from the battery cell 20 can enter the collection chamber 11b through the thermal management component 13. Besides, due to the existence of the thermal management component 13, the emissions can be isolated from the electrical chamber 11a as far as possible, thus reducing the risk resulting from the emissions and enhancing the safety of the battery.

Optionally, in an embodiment of the present application, the electrical chamber 11a may be composed of a covering having an opening and a thermal management component 13. For example, as shown in FIG. 13, a covering 110 has an opening (a lower side opening in FIG. 13). The covering 110 with the opening is a semi-closed chamber with an opening in communication with the outside, and the thermal management component 13 covers the opening to form a chamber, i.e., an electrical chamber 11a.

Optionally, the covering 110 may be composed of multiple portions. For example, as shown in FIG. 14, the covering 110 may include a first portion 111 and a second portion 112. Two sides of the second portion 112 have openings, respectively. The first portion 111 covers the opening on one side of the second portion 112, and the thermal management component 13 covers the opening on the other side of the second portion 112, thus forming the electrical chamber 11a.

The embodiment of FIG. 14 may be obtained through improvements on the basis of FIG. 2. Specifically, a bottom wall of the second portion 112 in FIG. 2 may be replaced with the thermal management component 13, and the thermal management component 13 acts as a wall of the electrical chamber 11a, thus forming the electrical chamber 11a in FIG. 14. In other words, the bottom wall of the second portion 112 in FIG. 2 can be removed. That is, an annular wall with two opening sides is formed, and the first portion 111 and the thermal management component 13 cover the openings on the two sides of the second portion 112 respectively to form a chamber, namely an electrical chamber 11a.

Figure 15:
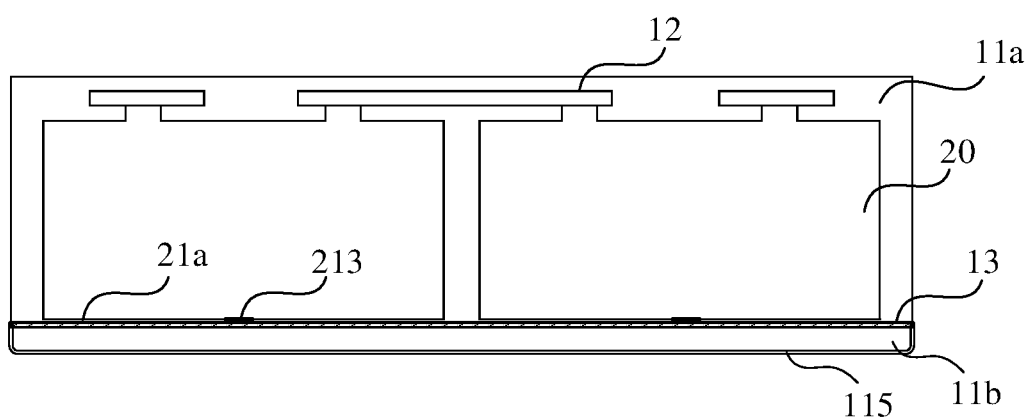

Optionally, in an embodiment of the present application, the collection chamber 11b may be composed of a thermal management component 13 and a protective member. For example, as shown in FIG. 15, the battery 10 further includes a protective member 115. The protective member 115 is configured to protect the thermal management component 13, and the protective member 115 and the thermal management component 13 form the collection chamber 11b.

The collection chamber 11b formed by the protective member 115 and the thermal management component 13 does not occupy the space that may accommodate the battery cell. Therefore, the collection chamber 11b with a larger space therein can be provided, which may effectively collect and buffer the emissions and reduce the risk resulting thereof.

Optionally, in an embodiment of the present application, the fluid, such as a cooling medium, or a component for accommodating the fluid, may be further provided in the collection chamber 11b to further cool the emissions entering the collection chamber 11b.

Optionally, in an embodiment of the present application, the collection chamber 11b may be a sealed chamber. For example, the connection between the protective member 115 and the thermal management component 13 may be sealed by a sealing member.

Optionally, in an embodiment of the present application, the collection chamber 11b may not be a sealed chamber. For example, the collection chamber 11b may be in communication with the air, and as such, a part of the emissions may further be discharged to the outside of the collection chamber 11b.

In the foregoing embodiment, the thermal management component 13 covers the opening of the covering 110 to form an electrical chamber 11a, and the thermal management component 13 and the protective member 115 form the collection chamber 11b. Optionally, the thermal management component 13 may also directly separate the closed covering into the electrical chamber 11a and the collection chamber 11b.

Figures 16, 17:
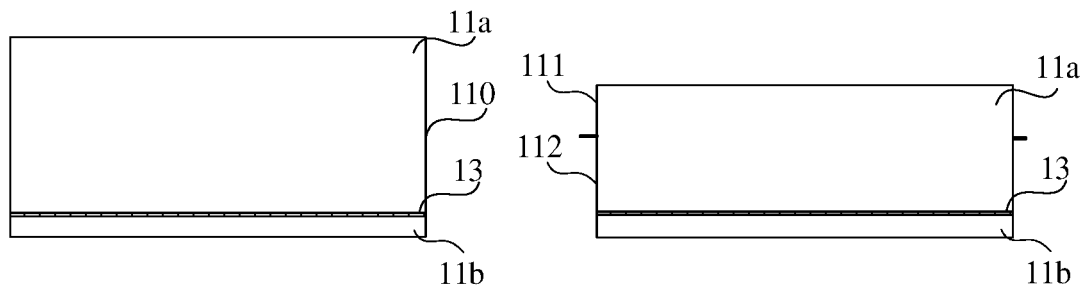

For example, as shown in FIG. 16, in an embodiment of the present application, the thermal management component 13 is arranged inside the covering 110, and separate the interior of the covering 110 into the electrical chamber 11a and the collection chamber 11b. That is, the closed covering 110 internally forms a chamber, and the thermal management component 13 separates the chamber inside the covering 110 into two chambers, namely the electrical chamber 11a and the collection chamber 11b.

Since the electrical chamber 11a needs a relatively large space to accommodate a plurality of battery cells 20, etc., the thermal management component 13 may be provided near a certain wall of the covering 110 to isolate the electrical chamber 11a with a relatively large space from the collection chamber 11b with a relatively small space.

Optionally, as shown in FIG. 17, in an embodiment of the present application, the covering 110 may include a first portion 111 and a second portion 112. A side of the second portion 112 has an opening to form a semi-closed structure. The semi-closed structure is a chamber with an opening. The thermal management component 13 is provided inside the second portion 112, and the first portion 111 covers the opening of the second portion 112. In other words, the thermal management component 13 can be first placed in the semi-closed second portion 112 to isolate the collection chamber 11b, and then the first portion 111 covers the opening of the second portion 112 to form the electrical chamber 11a.

Optionally, in an embodiment of the present application, the electrical chamber 11a is isolated from the collection chamber 11b by the thermal management component 13. That is, the collection chamber 11b is not in communication with the electrical chamber 11a, and liquid or gas, etc. in the collection chamber 11b cannot enter the electrical chamber 11a, so that the electrical chamber 11a can be better protected.

Figure 18:
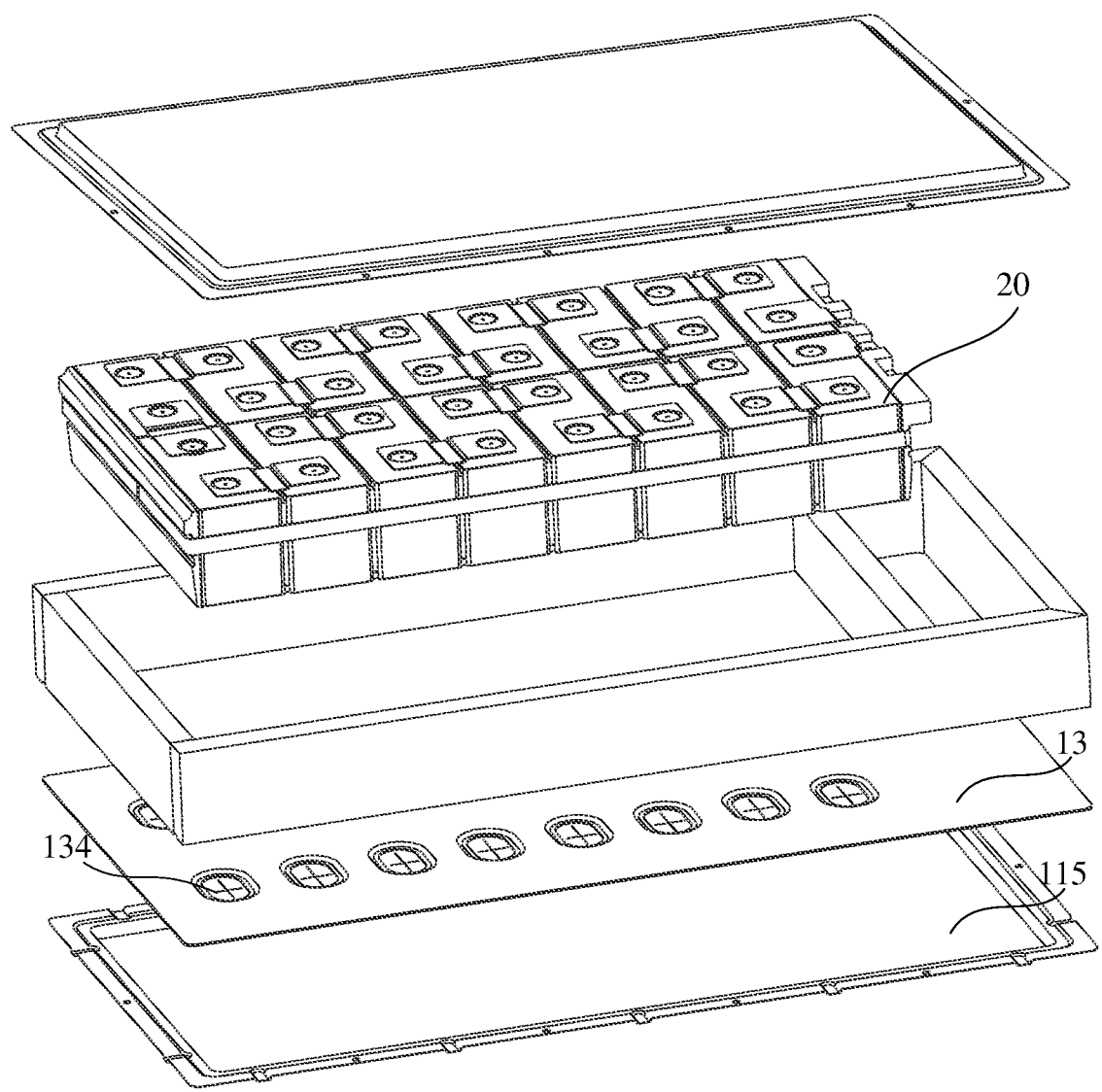
FIG. 18 is an exploded view of a battery according to an embodiment of the present application.

FIG. 18 is an exploded view of a battery 10 according to an embodiment of the present application. In the embodiment shown in FIG. 18, the thermal management component 13 is provided with a recess 134, and forms a collection chamber together with a protective member 115.

For the description of each component in the battery 10, reference can be made to the foregoing embodiments, which will not be repeated here for brevity.

An embodiment of the present application further provides a power consumption device, which may include the battery 10 in each of the foregoing embodiments. Optionally, the power consumption device may be a vehicle 1, a ship or a spacecraft.

The battery and the power consumption device of the embodiments of the present application are described above, and a method and a device for preparing a battery of the embodiments of the present application will be described below. For the parts that are not described in detail, reference is made to the foregoing embodiments.

Figures 19, 20:
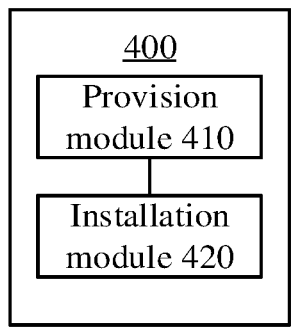
FIG. 19 is a schematic flowchart of a method for preparing a battery according to an embodiment of the present application.
FIG. 20 is a schematic block diagram of a device for preparing a battery according to an embodiment of the present application.

FIG. 19 shows a schematic flowchart of a method 300 for preparing a battery according to an embodiment of the present application. As shown in FIG. 19, the method 300 may include:

310, providing a battery cell 20, the battery cell 20 including a pressure relief mechanism 213, the pressure relief mechanism 213 being arranged in a first wall 21a of the battery cell 20, and the pressure relief mechanism 213 being configured, when an internal pressure or temperature of the battery cell 20 reaches a threshold, to be actuated to release the internal pressure or temperature;

320, providing a thermal management component 13, the thermal management component 13 being used to contain a fluid; and 330, attaching a first surface of the thermal management component 13 to the first wall 21a, wherein the thermal management component 13 can be damaged when the pressure relief mechanism 213 is actuated, so that the fluid is discharged from inside of the thermal management component 13.

FIG. 20 shows a schematic block diagram of a device 400 for preparing a battery according to an embodiment of the present application. As shown in FIG. 20, the device 400 for preparing a battery may include: a provision module 410 and an installation module 420.

The provision module 410 is configured to: provide a battery cell 20, the battery cell 20 including a pressure relief mechanism 213, the pressure relief mechanism 213 being arranged in a first wall 21a of the battery cell 20, and the pressure relief mechanism 213 being configured, when an internal pressure or temperature of the battery cell 20 reaches a threshold, to be actuated to release the internal pressure or temperature; and provide a thermal management component 13, the thermal management component 13 being used to contain a fluid.

The installation module 420 is configured to: attach a first surface of the thermal management component 13 to the first wall 21a, wherein the thermal management component 13 can be damaged when the pressure relief mechanism 213 is actuated, so that the fluid is discharged from inside of the thermal management component 13.

It should be finally noted that, the above embodiments are merely used for illustrating rather than limiting the technical solutions of the present application. Although the present application is illustrated in detail with reference to the foregoing embodiments, those of ordinary skill in the art should understand that they can still modify the technical solutions described in the foregoing embodiments, or make equivalent substitutions to some of the technical features therein, but these modifications or substitutions can be made to the respective technical solutions without departing from the spirit and scope of the technical solutions of the embodiments of the present application.

What is claimed is:

1. A battery, comprising:
a battery cell comprising a pressure relief mechanism, the pressure relief mechanism being arranged in a first wall of the battery cell, and the pressure relief mechanism being configured, when an internal pressure or temperature of the battery cell reaches a threshold, to be actuated to release the internal pressure; and
a thermal management component for containing a fluid to adjust a temperature of the battery cell;
wherein a first surface of the thermal management component is attached to the first wall, when the pressure relief mechanism is actuated, emissions from the battery cell are discharged toward the thermal management component, and the thermal management component is configured to be capable of being damaged when the pressure relief mechanism is actuated, so that the fluid is discharged from inside of the thermal management component;

wherein the thermal management component is provided with a second through hole therein, the second through hole being configured such that emissions discharged from the battery cell can pass through the thermal management component via the second through hole when the pressure relief mechanism is actuated;

wherein a radial dimension of the second through hole gradually decreases in a direction away from the pressure relief mechanism.

2. The battery according to claim 1, wherein the thermal management component is configured to be damaged by emissions discharged from the battery cell when the pressure relief mechanism is actuated, so that the emissions pass through the thermal management component.

3. The battery according to claim 2, wherein the hole wall of the second through hole is configured to be capable of being broken through and/or melted by the emissions, so that the fluid is discharged from the inside of the thermal management component.

4. The battery according to claim 1, wherein a hole wall of the second through hole is configured to be capable of being damaged by the emissions, so that the fluid is discharged from the inside of the thermal management component.

5. The battery according to claim 1, wherein an area of an opening of the second through hole is related to an area of the pressure relief mechanism.

6. The battery according to claim 5, wherein a ratio of the area of the opening of the second through hole to the area of the pressure relief mechanism ranges from 0.5 to 2.

7. The battery according to claim 1, wherein at least a portion of the pressure relief mechanism protrudes from the first wall, and the second through hole is used to accommodate the at least portion of the pressure relief mechanism.

8. The battery according to claim 1, wherein a portion of the first wall around the pressure relief mechanism protrudes outward, and the second through hole is used to accommodate an outward protruding portion of the first wall around the pressure relief mechanism.

9. The battery according to claim 1, wherein the pressure relief mechanism is provided with a breaking device, the breaking device being used to damage the thermal management component when the pressure relief mechanism is actuated, so that the fluid is discharged from the inside of the thermal management component.

10. The battery according to claim 9, wherein the breaking device is a spike.

11. The battery according to claim 1, wherein the second through hole is arranged opposite to the pressure relief mechanism.

12. The battery according to claim 1, wherein a part of the thermal management component around the second through hole can be damaged by the emissions from the battery cell, so that the fluid is discharged from the inside of the thermal management component.

13. The battery according to claim 1, further comprising:
an electrical chamber for accommodating a plurality of the battery cells; and
a collection chamber for collecting emissions discharged from the battery cells and emissions from the thermal management component when the pressure relief mechanism is actuated;
wherein the thermal management component is configured to isolate the electrical chamber from the collection chamber, and the thermal management component has a wall shared by the electrical chamber and the collection chamber; and
the thermal management component is configured to enable the emissions discharged from the battery cell to pass through the thermal management component and enter the collection chamber when the pressure relief mechanism is actuated.

14. A power consumption device, comprising: a battery;
wherein the battery comprises:
a battery cell comprising a pressure relief mechanism, the pressure relief mechanism being arranged in a first wall of the battery cell, and the pressure relief mechanism being configured, when an internal pressure or temperature of the battery cell reaches a threshold, to be actuated to release the internal pressure; and
a thermal management component for containing a fluid to adjust a temperature of the battery cell;
wherein a first surface of the thermal management component is attached to the first wall, when the pressure relief mechanism is actuated, emissions from the battery cell are discharged toward the thermal management component, and the thermal management component is configured to be capable of being damaged when the pressure relief mechanism is actuated, so that the fluid is discharged from inside of the thermal management component;
wherein the thermal management component is provided with a second through hole therein, the second through hole being configured such that emissions discharged from the battery cell can pass through the thermal management component via the second through hole when the pressure relief mechanism is actuated;
wherein a radial dimension of the second through hole gradually decreases in a direction away from the pressure relief mechanism.

* * * * *